United States Patent [19]

Iwama et al.

[11] 4,193,800

[45] Mar. 18, 1980

[54] PHOTOGRAPHIC DYE MORDANT

[75] Inventors: Hideaki Iwama; Mikio Koyama; Yasuo Tsuda; Masao Asano, all of Hino, Japan

[73] Assignee: Konishiroku Photo Industry Co., Ltd., Tokyo, Japan

[21] Appl. No.: 952,816

[22] Filed: Oct. 19, 1978

[30] Foreign Application Priority Data

Oct. 24, 1977 [JP] Japan ................................ 52-127794
Aug. 8, 1978 [JP] Japan ................................ 53-96462

[51] Int. Cl.[2] ......................... G03C 5/54; G03C 1/40; C03C 17/06; C03C 21/00

[52] U.S. Cl. .................................... 430/213; 428/500; 526/305; 526/307; 430/238; 430/644

[58] Field of Search ................. 96/290, 77, 84 A, 114, 96/119 R; 428/500; 526/52.2, 305, 307

[56] References Cited

U.S. PATENT DOCUMENTS

| | | | |
|---|---|---|---|
| 3,709,690 | 1/1973 | Cohen et al. | 96/77 |
| 3,958,995 | 5/1976 | Campbell et al. | 96/77 |

*Primary Examiner*—Richard L. Schilling
*Attorney, Agent, or Firm*—Frishauf, Holtz, Goodman & Woodward

[57] ABSTRACT

A photographic element particularly for the color diffusion transfer process having a support and an image pattern receiving layer which comprises a polymer containing at least 10 mole percent of a repeating unit of the formula:

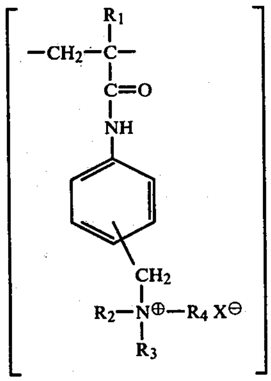

wherein $R_1$ represents a hydrogen atom or a methyl group; $R_2$, $R_3$ and $R_4$ each represent an alkyl group, an aralkyl group, a cycloalkyl group or a cycloalkylalkyl group; and $X^{\oplus}$ represents a monovalent anion.

25 Claims, No Drawings

PHOTOGRAPHIC DYE MORDANT

This invention relates to a photographic element which comprises a layer containing a novel polymer. More particularly, this invention relates to a photographic element which is mainly for the use of color diffusion transfer process and in which the polymer is used as an excellent mordant for dyes.

In color diffusion transfer processes, a dye image is formed by forming a latent image after imagewise exposure to light of a layer containing a light-sensitive silver halide emulsion having associated therewith an image providing material; by developing the thus formed latent image with a processing composition to form diffusible dyes or dye-precursors distributed imagewise; and by subjecting at least a part of the thus formed dyes or dye-precursors to diffusion transfer to an image receiving layer laid on said emulsion containing layer. As described in each specification of U.S. Pat. Nos. 3,271,147, 3,770,439 and 3,958,995; British Pat. Nos. 1,366,896 and 1,366,870; and so on, it has hitherto been known to use various polymeric compounds as mordants to prevent the migration of dyes in the image receiving layer. For instance, U.S. Pat. Nos. 3,709,690 and 3,770,439 disclose a polymer containing quaternary nitrogen atoms, which can not however be considered to possess a sufficient property. Namely, such polymers used as mordants in an image receiving layer possesses only a weak dye-holding property so that the dye once fixed are liable to be released or desorbed; the color density of the dye image obtained decreases accordingly; and thus only a poor image pattern can be obtained in which not only color-balance is lost but also sharpness and resolution are insufficient. Further, a mordanting property of such polymers is not so sufficient as to catch efficiently in a short time a diffusible dye or a diffusible dye precursor which diffuses to the image receiving layer. On the other hand, even such polymers as are free from the defects mentioned above are inferior in film-formability, sometimes release substances which adversely affect the photographic properties, and suffer from insufficient stability of the dye image thereon and so on.

In order to solve the problems mentioned above, extensive studies have been carried out to find out novel polymers for mordants to be used in an image receiving layer. This invention relates to a photographic element mainly for color diffusion transfer process, which element comprises a novel polymer preferably as a mordant.

The first object of this invention is to provide a photographic element comprising an image receiving layer containing an excellent mordant.

The second object of this invention is to provide a photographic element in which a diffusible dye or a diffusible dye precursor is mordanted in a short time when it has diffused to the image receiving layer to give an excellent image with high density.

The third object of this invention is to provide a photographic element comprising an image receiving layer in which the deteriorations of the dye image formed in the image receiving layer, which are caused by the desorption of the dye or by such substances as an excess amount of dyes and dye precursors, staining substances and the like, are prevented, thus giving a good image-pattern-retaining property.

The fourth object of this invention is to provide a photographic element comprising a polymer having an excellent mordant property without exerting bad influence upon photographic properties.

The fifth object of this invention is to provide a photographic element comprising a polymer which in itself is excellent in film-forming property and can be used as a mordant having an excellent film-forming property even when it is used in combination with a binder.

The objects of this invention which were mentioned above and will be mentioned hereinbelow have been attained by the use of a photographic element which comprises a support and a layer containing a polymeric mordant having at least 10 mole % of a repeating unit represented by formula (I):

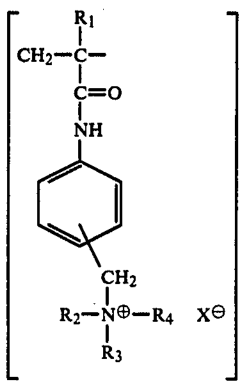

(I)

wherein $R_1$ represents a hydrogen atom or a methyl group; $R_2$, $R_3$ and $R_4$ each represent an alkyl group, an aralkyl group, a cycloalkyl group or a cycloalkylalkyl group; and $X^{\oplus}$ represents a monovalent anion.

$R_2$, $R_3$ and $R_4$ each may preferably be an alkyl group having 1 to 20 carbon atoms, more preferably 1 to 18 carbon atoms or an aralkyl group having 1 to 12 carbon atoms. In view of prevention of migration of mordant itself, at least one of $R_2$, $R_3$ and $R_4$ is preferably an aralkyl, or when $R_2$, $R_3$ and $R_4$ are each an alkyl group, the total number of carbon atoms thereof is preferably 12 to 24. In the most preferred embodiment of this invention, $R_2$ and $R_3$ each represent an alkyl group having 1 to 18 carbon atoms and $R_4$ represents an aralkyl group having 7 to 12 carbon atoms.

As examples of the alkyl group represented by $R_2$, $R_3$ or $R_4$, there may concretely be mentioned methyl, ethyl, propyl, isopropyl, butyl, isobutyl, hexyl, octyl, dodecyl or octadecyl.

As examples of the aralkyl group represented by $R_2$, $R_3$ or $R_4$, there may concretely be mentioned benzyl, methylbenzyl, methoxybenzyl, phenethyl, nitrobenzyl or naphthylmethyl.

As examples of the cycloalkyl group represented by $R_2$, $R_3$ or $R_4$, there may concretely be mentioned cyclopentyl, cyclohexyl or methylcyclohexyl.

As an example of the cycloalkylalkyl group represented by $R_2$, $R_3$ or $R_4$, there may concretely be mentioned cyclopentylmethyl.

As the anions represented by $X^{\oplus}$, there may be mentioned, for example, a halogen ion such as a chlorine ion, a bromine ion and the like; a sulfate ion; an alkylsulfate ion such as methylsulfate ion, ethylsulfate ion and the like; a sulfonate ion such as p-toluenesulfonate ion and the like; an acetate ion; a phosphate ion; a dialkylphosphate ion; and so on, preferably a halogen ion or a alkylsulfate ion, more preferably a chlorine ion, an methylsulfate ion or an ethylsulfate ion.

The position, on which the quaternary ammonium moiety is linked to the benzene ring through the methylene group, may preferably be the meta- or para-position in relation to the group —CONH—. A polymer containing a mixture of the meta- and para-substituents may have almost the same effect as that of a polymer containing the meta- or para-substituent.

The polymer according to this invention may contain other repeating units than the units of formula (I). In such a case, the rate of the unit represented by formula (I) is not less than 10 mole %, preferably 20 mole % based on the total mole number of the units contained in the molecule of the polymer according to this invention.

In the other repeating units than the unit of formula (I) are included not only a unit derived from a monomer having one copolymerizable ethylenically unsaturated group but also a unit derived from a monomer having at least two copolymerizable ethylenically unsaturated groups.

As a monomer which is copolymerizable with the monomer which derives the unit of formula (I), there may be mentioned, for example, alkenes such as ethylene, propylene, 1-butene, isobutene, 2-methylpentene and 2-methylbutene; alkapolyenes such as butadiene, isoprene and 1,1,4,4-tetramethylbutadiene; styrenes such as styrene, α-methylstyrene, p-chlorostyrene, p-methylstyrene, p-chloromethylstyrene, m-ethylstyrene and p-ethylstyrene; esters of ethylenically unsaturated mono- or dicarboxylic acids such as lower-alkyl esters of acrylic or methacrylic acid, e.g., methyl acrylate, ethyl acrylate, n-butyl acrylate, methyl methacrylate, ethyl methacrylate, n-propylmethacrylate, n-butyl methacrylate, methyl α-chloroacrylate, α-hydroxyethyl acrylate and α-N,N-dimethylaminoethyl acrylate, p-benzoyloxyphenyl methacrylate and diethyl methylenemalonate; monoethylenically unsaturated compounds such as nitriles, e.g., acrylonitrile, methacrylonitrile and allyl cyanide; monoethylenically unsaturated esters of aliphatic acids such as vinyl acetate, isopropenyl acetate, allyl acetate and vinyl butyrate; halogenated olefins such as vinyl chloride and vinylidene chloride; amides of acrylic or methacrylic acid such as acrylamide, methacrylamide, N-methylacryamide, N,N-dimethyacrylamide,

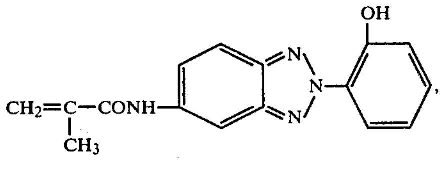,

N-p-chloromethylphenylmethacrylamide, N-p-chloromethylphenyl-acrylamide and diacetone acrylamide; vinyl ethers such as vinyl methyl ether and vinyl ethyl ether; N-vinyl pyrolidone and the like; fluorinated unsaturated compounds such as the following compounds:

$CF_2{=}CF_2$, $CH_2{=}C(CH_3)—CO_2CH_2(CF_2)_nH$ (n=2-8), $CH_2{=}CH\text{-}OCO(CF_2)_nH$ (n=2-8);

and so on.

As a monomer which may be copolymerized with the monomer which gives the unit of formula (I), there may be mentioned monomers having at least 2 ethylenically unsaturated groups, preferably a monomer represented by formula (III):

$$(CH_2{=}\overset{R_5}{\overset{|}{C}}\!\!-\!)_n\!-\!R_6 \qquad \text{(III)}$$

wherein n is an integer of more than 1, preferably 2 or 3, and more preferably 2; $R_5$ is selected from a hydrogen atom and a methyl group; $R_6$ is a connecting moiety.

As the connecting moiety represented by $R_6$ in formula (III) may be mentioned, for example, an alkylene group such as ethylene, trimethylene, 1,3-butylene and phenylethylene; an alkylidene group such as methylene, ethylidene and isopropylidene; an alkylidyne such as methylidyne and trichloroethylidyne; an arylene such as phenylene; a group comprising —CONH—, —$SO_2$NH— and —COO—; and other connecting moiety which comprises combination of above-mentioned groups, e.g., methyleneoxycarbonyl, ethylenebis(oxycarbonyl), phenylenebis(oxycarbonyl), 4,4'-isopropyridenebis(phenyleneoxycarbonyl), 1,2,3-propanetriyltris(oxycarbonyl), cyclohexylenebis(methyleneoxycarbonyl), methyleneoxymethylenecarbonyloxy, methyleneiminocarbonyl, oxymethyleneoxy, ethylenebis(oxyethyleneoxycarbonyl), ethylidynetris(oxycarbonyl).

As the concrete examples of the compound represented by formula (III), there may be mentioned the following: divinylbenzene, allyl acrylate, allyl methacrylate, N-allylmethacrylamide, 4,4'-isopropyridenediphenyl diacrylate, 1,3-butylene diacrylate, 1,3-butylene dimethacrylate, 1,4-cyclohexylenedimethylene dimethacrylate, diethylene glycol dimethacrylate, diisopropylene glycol dimethacrylate, divinyloxymethane, ethylene diacrylate, ethylene dimethacrylate, ethylidene diacrylate, ethylidene dimethacrylate, 1,6-diacrylamidohexane, 1,6-hexamethylene diacrylate, N,N'-methylenebisacrylamidoneopentyl dimethacrylate, phenylethylene dimethacrylate, tetraethylene glycol dimethacrylate, tetramethylene diacrylate, tetramethylene dimethacrylate, 2,2,2-trichloroethylidene dimethacrylate, triethylene glycol diacrylate, triethylene glycol dimethacrylate, ethylidene trimethacrylate, propylidyne triacrylate, vinyl allyloxyacetate, vinyl methacrylate and 1-vinyloxy-α-alloxyethane.

As the other copolymerizable components for the polymer according to this invention, there may be used such monomers having ultraviolet absorbability as described in the specification of Japanese Patent Application 125857/1976 which was laid open to the public on May 9, 1978, as No. 53-50736/1978. In this case, the ratio of monomers to be copolymerized may optionally be selected from the descriptions above.

It is preferable that the mordant itself does not migrate to other layers. If the mordant itself sometimes migrates to other hydrophilic colloidal layers. The mordant which has thus migrated catches the acidic dye which has diffused, and thus prevents or retards remarkably the dye image formation in the image receiving layer. Furthermore, the dye which has been dyed on the mordant which has migrated sometimes is released again to cause color stain. In order to obtain mordant which is less mobile, the polymer according to this invention preferably comprises a repeating unit of formula (I) and another repeating unit derived from a copolymerizable ethylenically unsaturated hydrophobic monomer in which the rate of said another repeating unit is not less than 25 mole %, preferably 30 mole % based on the total mole number of the units contained in the polymer.

As the above-mentioned hydrophobic monomer there may be mentioned, for example, alkenes such as ethylene, propylene, 1-butene, isobutene, 2-methylpentene, and α-methylbutene; alkapolyenes such as butadiene, isoprene and 1,1,4,4-tetramethylbutadiene; styrenes such as styrene, α-methylstyrene, p-chlorostyrene, p-methylstyrene, p-chloromethyl styrene, m-ethylstyrene and p-ethylstyrene; esters of ethylenically unsaturated mono- or dicarboxylic acids such as lower-alkyl esters of acrylic or methacrylic acid, e.g., methyl acrylate, ethyl acrylate, n-butyl acrylate, methyl methacrylate, ethyl methacrylate, n-propylmethacrylate, n-butyl methacrylate, methyl α-chloroacrylate, α-hydroxyethyl acrylate and α-N,N-dimethylaminoethyl acrylate, p-benzoyloxyphenyl methacrylate and diethyl methylenemalonate; monoethylenically unsaturated compounds such as nitriles e.g., acrylonitrile, methacrylonitrile and allyl cyanide; monoethylenically unsaturated esters of aliphatic acids such as vinyl acetate, isopropenyl acetate, allyl acetate and vinyl butyrate; halogenated olefins such as vinyl chloride and vinylidene chloride; vinyl ethers such as vinyl methyl ether and vinyl ethyl ether; N-vinyl pyrolidone and the like; fluorinated unsaturated compounds such as the following compounds:

$CF_2{=}CF_2$, $CH_2{=}C(CH_3){-}CO_2CH_2(CF_2)_nH$ (n=2-8), $CH_2{=}CH\text{-}OCO(CF_2)_nH$ (n=2-8);

and so on.

Among these, are preferred styrenes, esters of ethylenically unsaturated monocarboxylic acids and halogenated olefins. In order to obtain further preferred mordant which is substantially immobile and can easily be coated without using organic solvents such as methanol and ethanol, the polymer according to this invention is substantially water-dispersible and comprises the units of formula [II]:

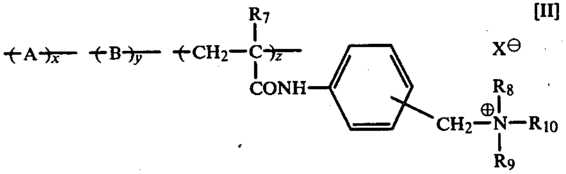

[II]

wherein A represents a unit derived from a copolymerizable monomer having at least two ethylenically unsaturated group; B represents a unit derived from a copolymerizable monomer having an ethylenically α,β-unsaturated group; $R_7$ represents a hydrogen atom or a methyl group; $R_8$ and $R_9$ each represent a lower alkyl group; $R_{10}$ represents an alkyl group, an aralkyl group, a cycloalkyl group or a cycloalkylalkyl group; $X^{\ominus}$ represents a monovalent anion; and x, y and z are from 0.5 to 6.0 mole % preferably from 1 to 5 mole %, from 0 to 79.5 mole % preferably from 0 to 69 mole % more preferably from 35 to 60 mole % and from 20 to 99.5 mole % preferably from 30 to 99 mole %, respectively.

As $R_7$ is preferred a methyl group in particular. As the lower alkyl group represented by $R_8$ and $R_9$ is preferred a lower alkyl group having 1 to 4 carbon atoms, e.g., methyl, ethyl, propyl, isopropyl, butyl, isobutyl, etc. As the alkyl group represented by $R_{10}$ is preferred an alkyl group having 1 to 16 carbon atoms and is more preferred an alkyl group having 1 to 12 carbon atoms, e.g., methyl, ethyl, isobutyl, hexyl, octyl, 2-ethylhexyl, dodecyl, etc. As the aralkyl group represented by $R_{10}$ is preferred an aralkyl group having 7 to 12 carbon atoms, e.g., benzyl, methylbenzyl, etc. As the cycloalkyl group represented by $R_{10}$ is preferred a cycloalkyl group having 5 to 6 carbon atoms, e.g., cyclopentyl, cyclohexyl, etc. As the cycloalkylalkyl group represented by $R_{10}$ is preferred, for example, a cyclopentylmethyl group.

As the anions represented by $X^{\oplus}$, there may be mentioned the same ions as described above in $X^{\oplus}$ of the formula (I), preferably a halogen ion or an alkylsulfate ion, more preferably a chlorine ion, a methylsulfate ion or an ethylsulfate ion.

The position, on which the quaternary ammonium moiety is linked to the benzene ring through the methylene group may preferably be the meta- or para-position in relation to the group —CONH—. A polymer containing both the meta- and para-substituents may have almost the same effect as that of a polymer containing a meta- or para-substituent. Particularly, in cases where $R_7$ is a hydrogen atom, a mixture of the meta- and para-forms may preferably be used in this invention.

A monomer which forms the unit A has not less than two ethylenically unsaturated groups and is preferably represented by the above-mentioned formula (III).

The most preferable monomer which forms the unit A is divinylbenzene. This divinylbenzene is preferably p-divinylbenzene, but m-divinylbenzene or a mixture of m-divinylbenzene and p-divinylbenzene may be used.

The suitable examples of a monomer which forms the unit B are such hydrophobic monomers as mentioned above. Among these, is preferred a styrene or a lower-alkyl ester of acrylic acid or methacrylic acid and more preferable is a styrene.

Although the molecular weight of the polymer according to this invention is not critical, it preferably ranges from about 5,000 to about 10,000, more preferably from about 10,000 to about 500,000 in view of dye-fixing property, film-formability and coating property in the case of a polymer having no cross-linkage.

The polymer according to this invention comprises a quaternary ammonium salt moiety in the part which forms a side-chain as mentioned-above and further a monomer unit linked to the main-chain through a linking group such as a phenylenemethylene group and a group of —CONH— type.

According to the characteristics of this invention, the objects of this invention have been accomplished. The present invention has advantages in that the polymer according to this invention possesses superior mordanting property as compared with the polymer having monomer unit, for example,

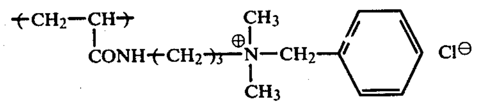

in which an alkylene group is used in place of the above-mentioned monomer unit, i.e., a phenylenemethylene group being described in U.S. Pat. No. 3,709,690 and having a very similar monomer unit to the above-mentioned monomer unit according to this invention and that the water-dispersible polymer can easily be prepared. As mentioned above, the polymer according to this invention exerts an effect which cannot be seen in cases where similar compounds are used. Further, the objects of the present invention have been accomplished by the collective effects of these groups as mentioned above.

Representative examples of the polymer according to this invention may concretely be illustrated as follows.

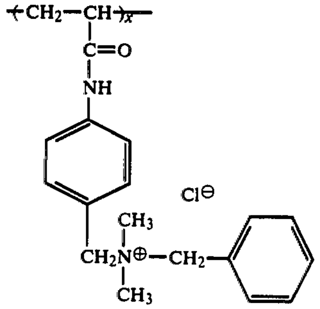
x:y = 50:50
(P-1)

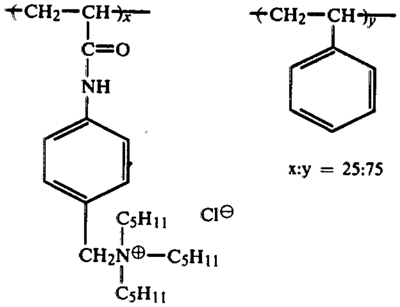
x:y = 25:75
(P-2)

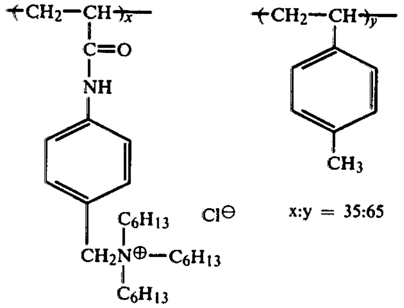
x:y = 35:65
(P-3)

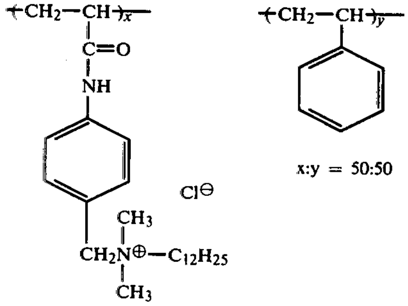
x:y = 50:50
(P-4)

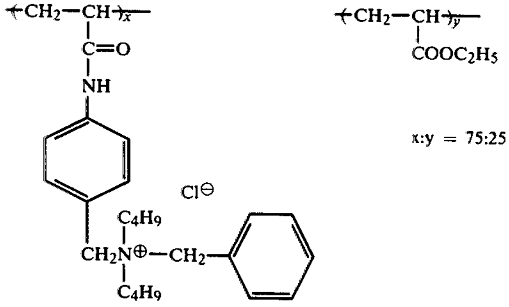
x:y = 75:25
(P-5)

-continued
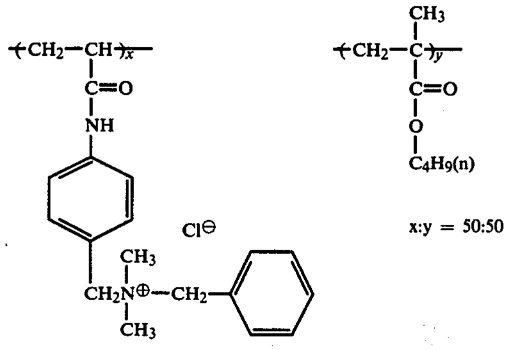
(P-6)
x:y = 50:50
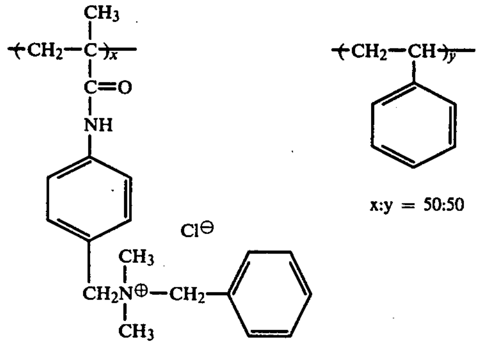
(P-7)
x:y = 50:50
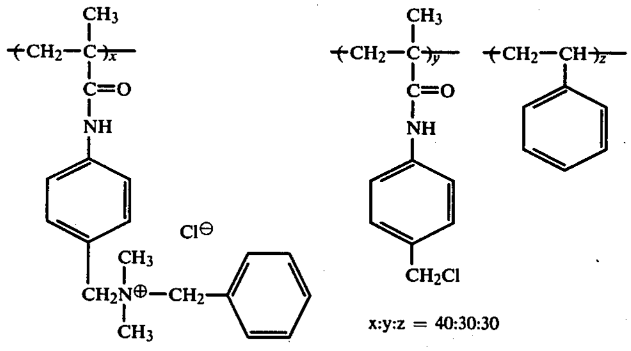
(P-8)
x:y:z = 40:30:30
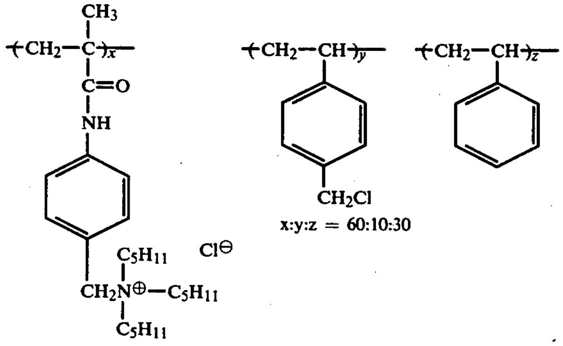
(P-9)
x:y:z = 60:10:30
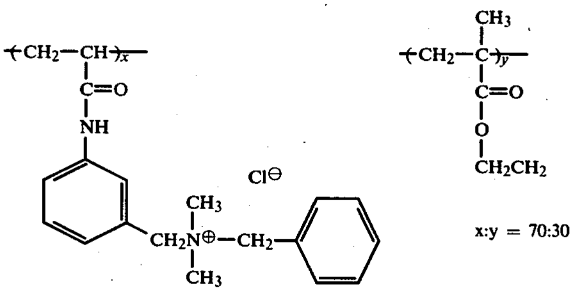
(P-10)
x:y = 70:30

-continued
(P-11)
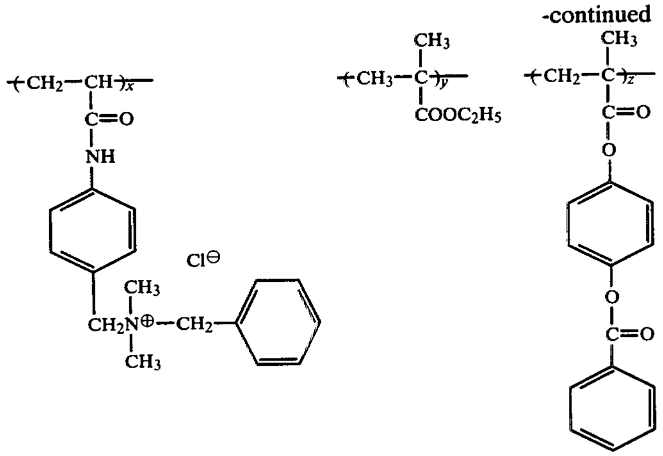
x:y:z = 40:55:5
(P-12)
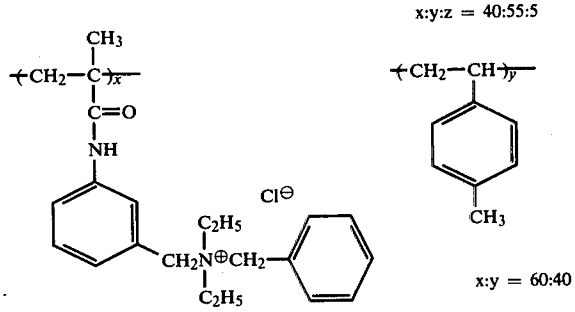
x:y = 60:40
(P-13)
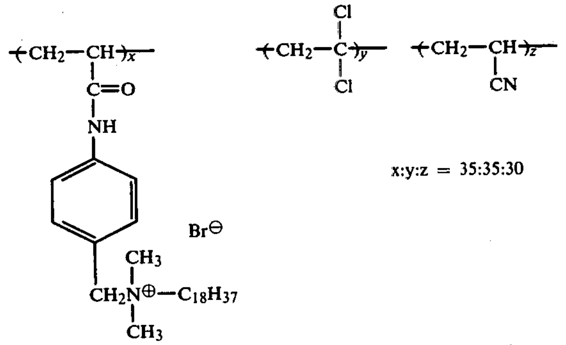
x:y:z = 35:35:30
(P-14)
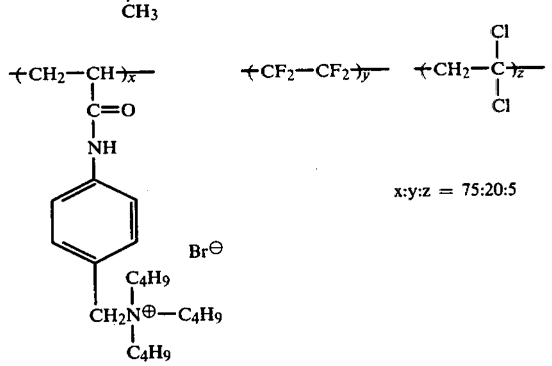
x:y:z = 75:20:5
(P-15)
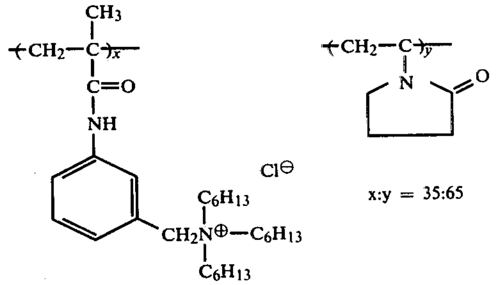
x:y = 35:65

-continued
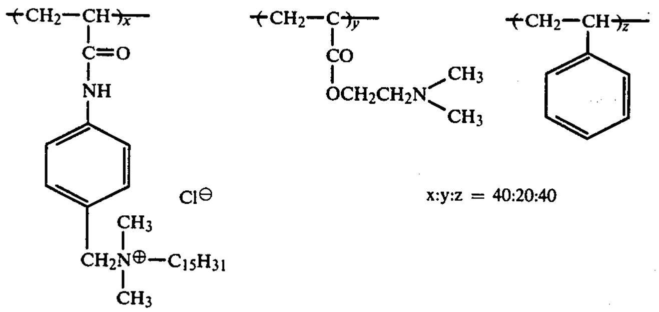
(P-16)
x:y:z = 40:20:40
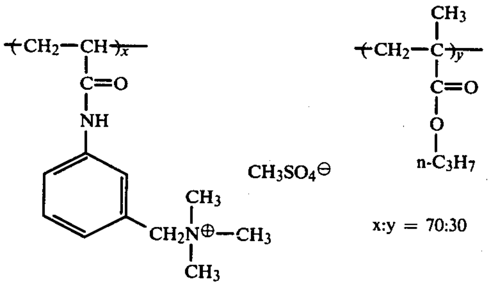
(P-17)
x:y = 70:30
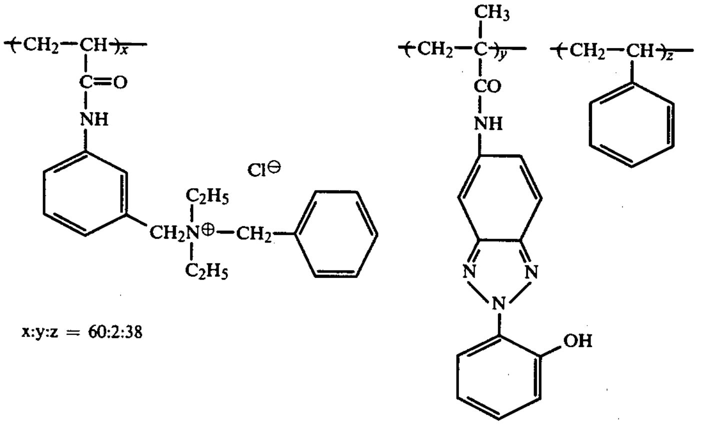
(P-18)
x:y:z = 60:2:38
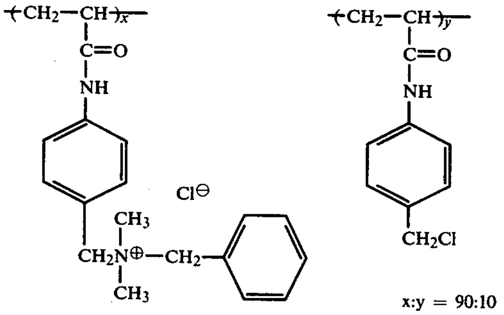
(P-19)
x:y = 90:10
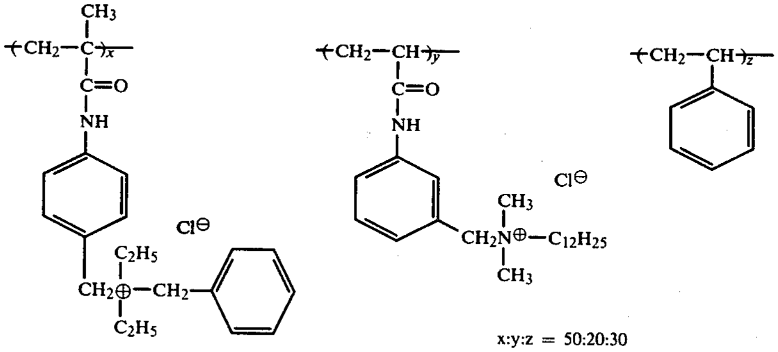
(P-20)
x:y:z = 50:20:30

-continued
(P-21)
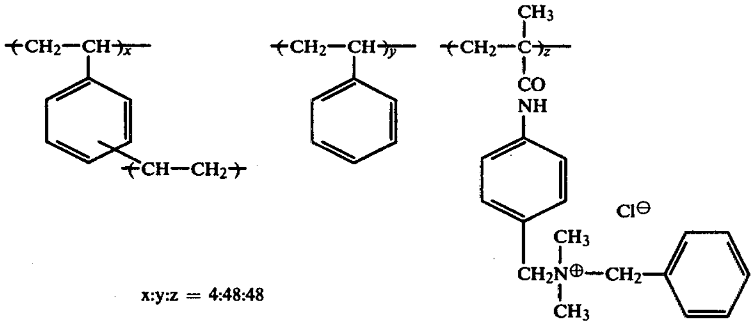
x:y:z = 4:48:48
(P-22)
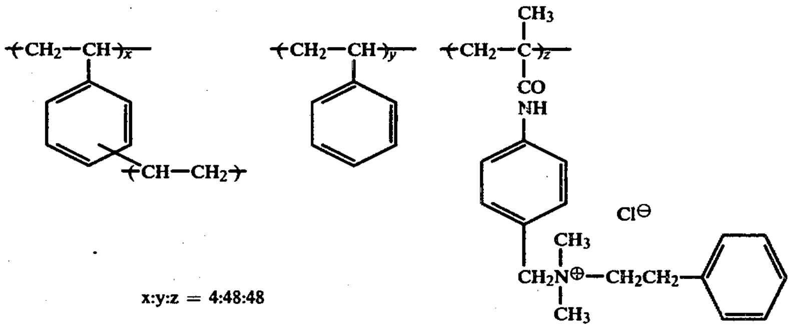
x:y:z = 4:48:48
(P-23)
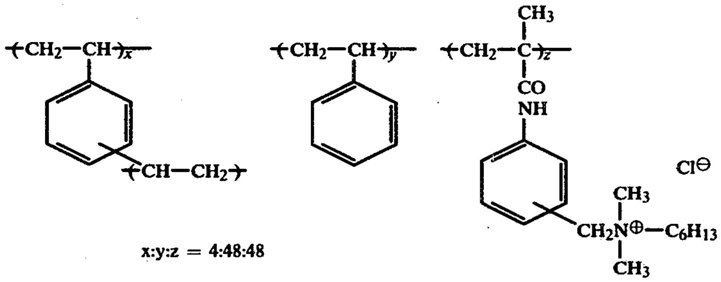
x:y:z = 4:48:48
(P-24)
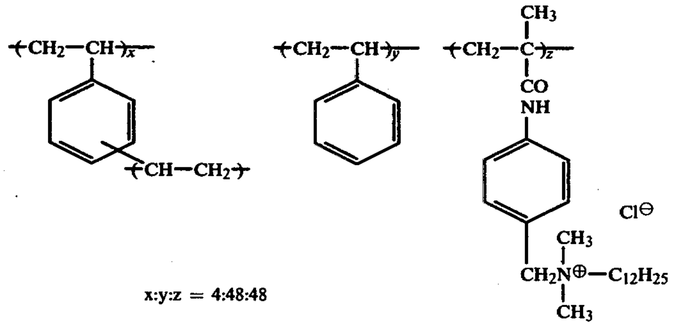
x:y:z = 4:48:48
(P-25)
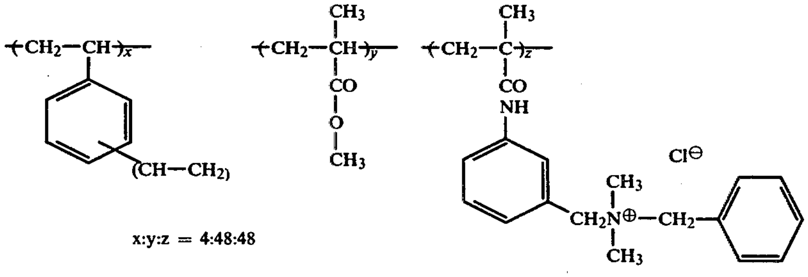
x:y:z = 4:48:48

-continued
(P-26)
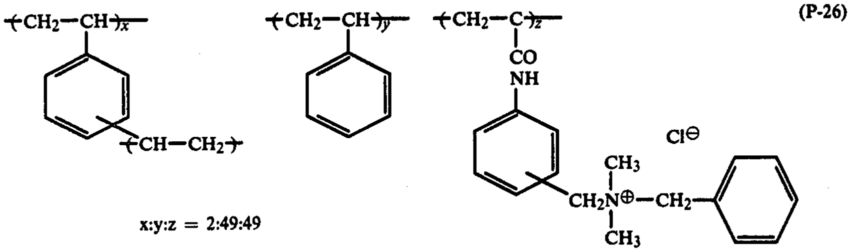
x:y:z = 2:49:49
(P-27)
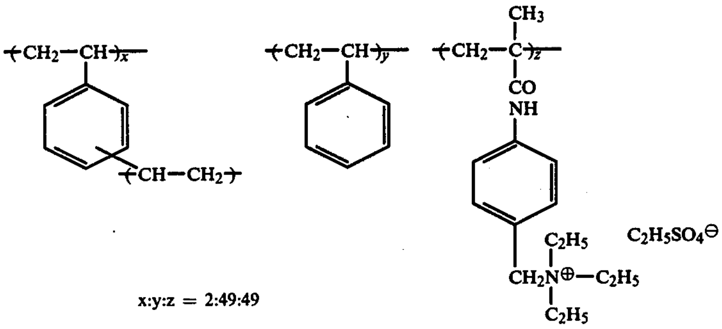
x:y:z = 2:49:49
(P-28)
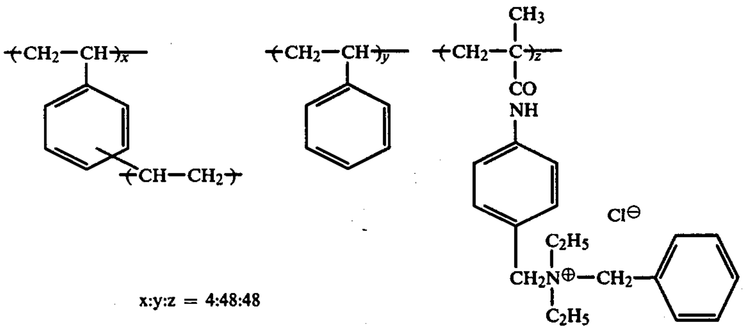
x:y:z = 4:48:48
(P-29)
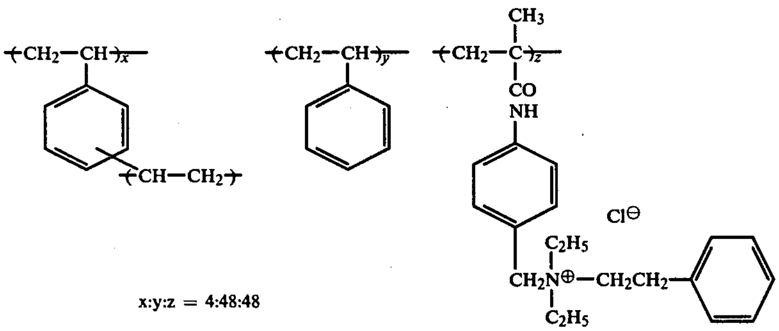
x:y:z = 4:48:48
(P-30)
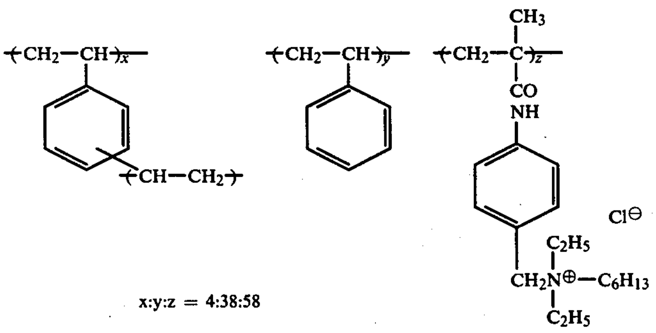
x:y:z = 4:38:58

-continued
(P-31)
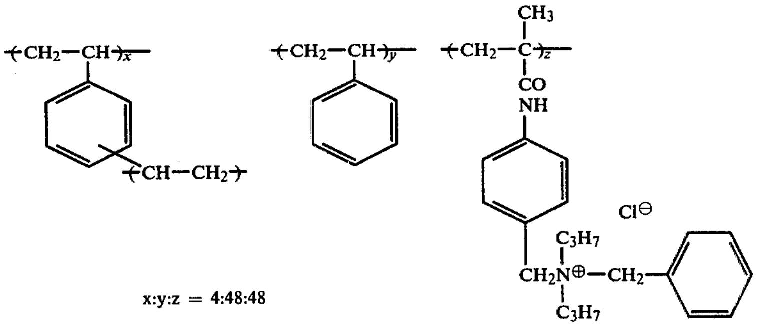
x:y:z = 4:48:48
(P-32)
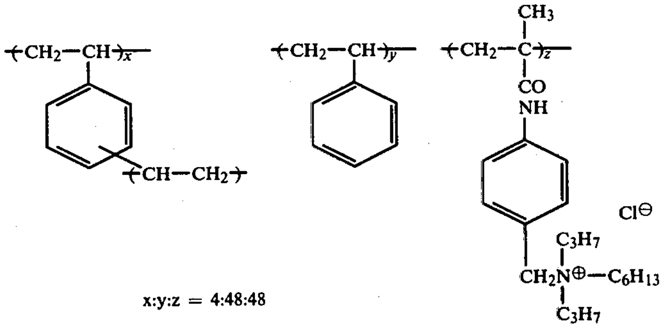
x:y:z = 4:48:48
(P-33)
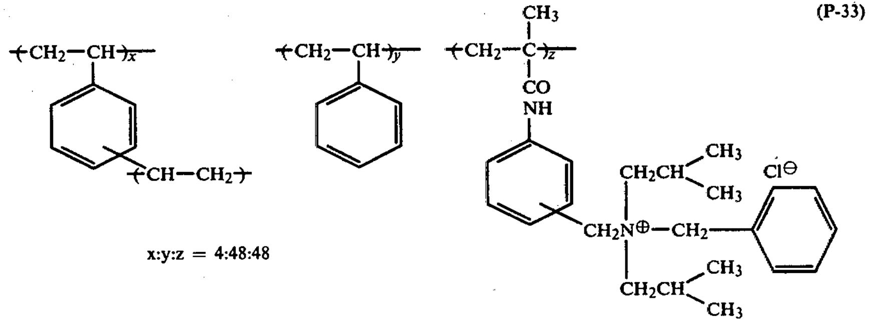
x:y:z = 4:48:48
(P-34)
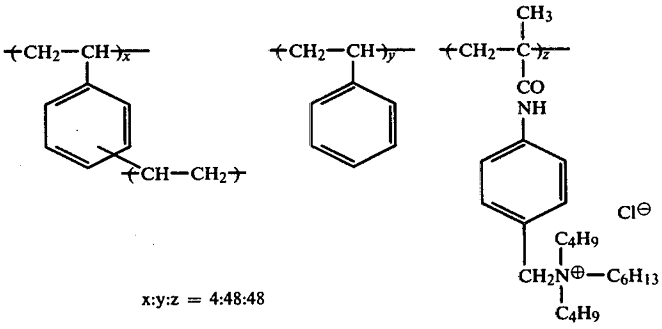
x:y:z = 4:48:48
(P-35)
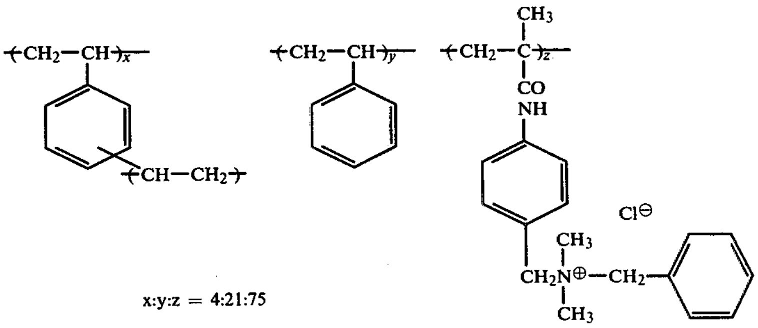
x:y:z = 4:21:75

-continued
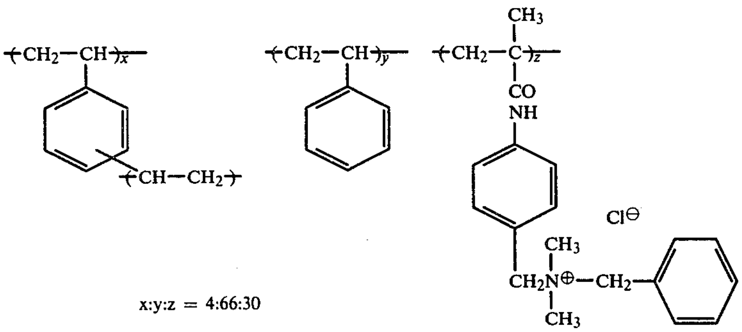
x:y:z = 4:66:30
(P-36)
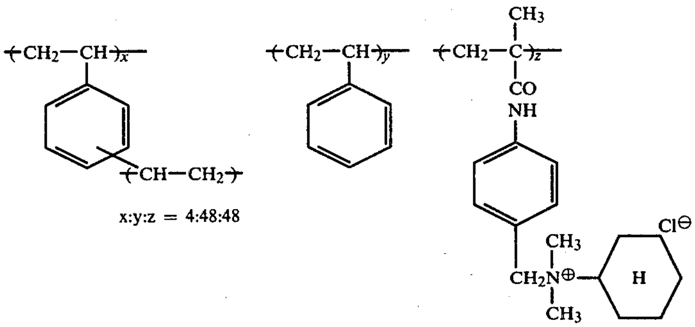
x:y:z = 4:48:48
(P-37)
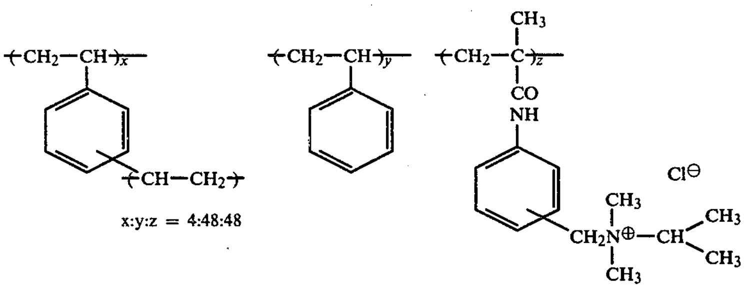
x:y:z = 4:48:48
(P-38)
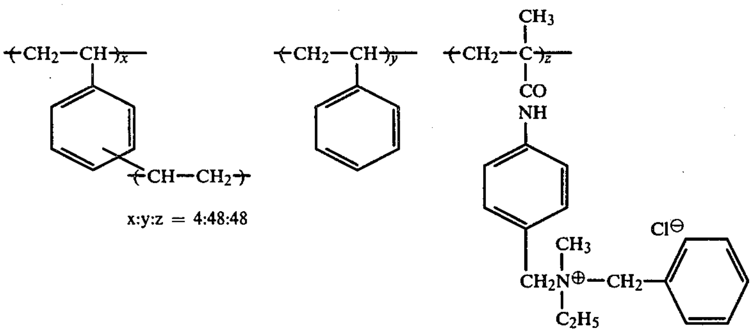
x:y:z = 4:48:48
(P-39)
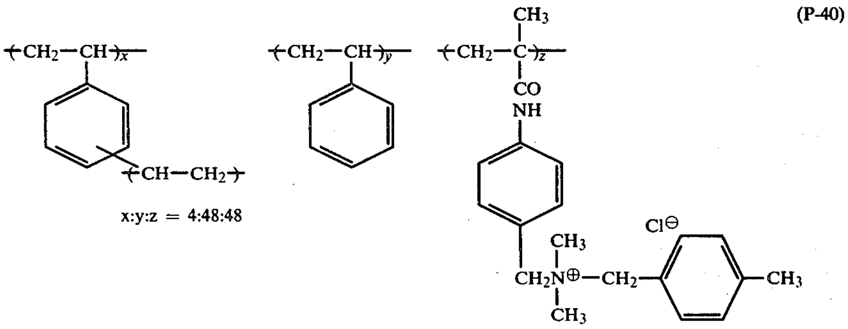
x:y:z = 4:48:48
(P-40)

-continued
(P-41)
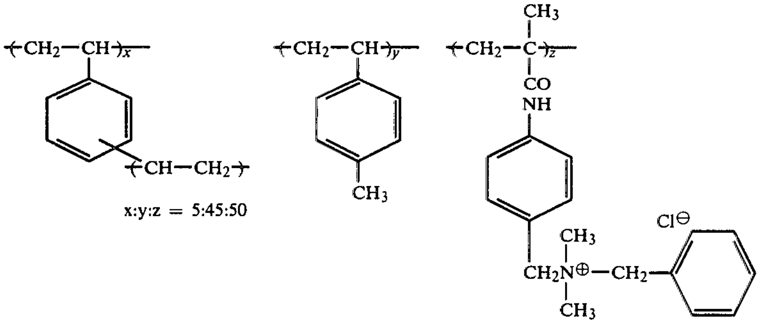
x:y:z = 5:45:50
(P-42)
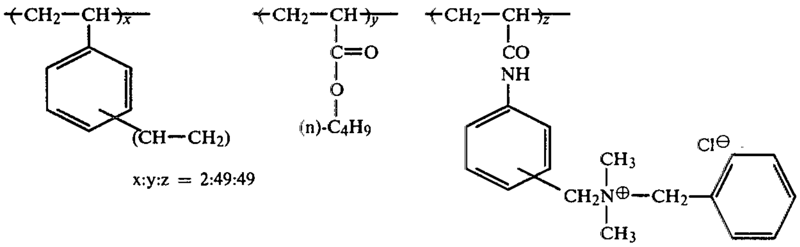
x:y:z = 2:49:49
(P-43)
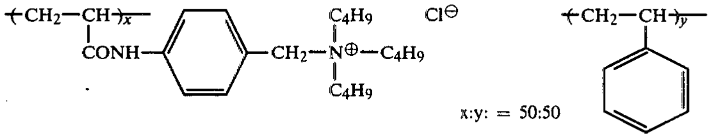
x:y: = 50:50
(P-44)
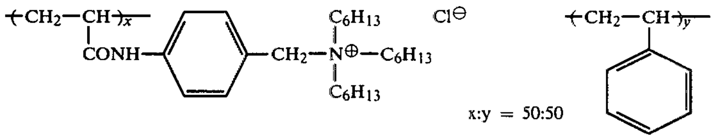
x:y = 50:50
(P-45)
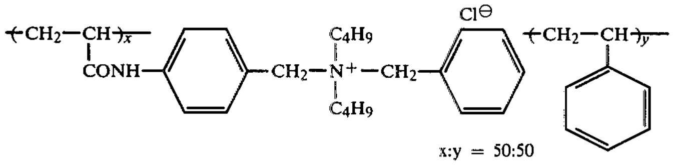
x:y = 50:50
(P-46)
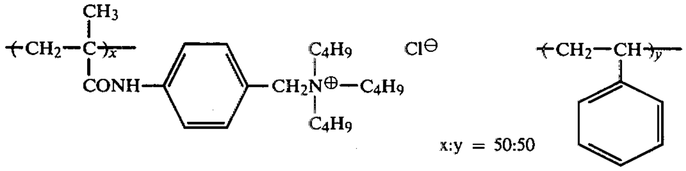
x:y = 50:50
(P-47)
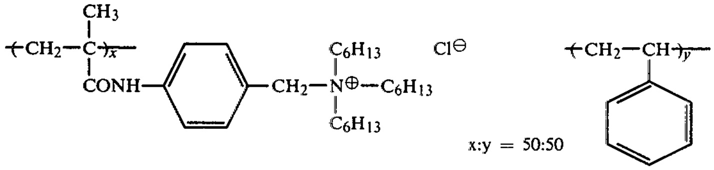
x:y = 50:50
(P-48)
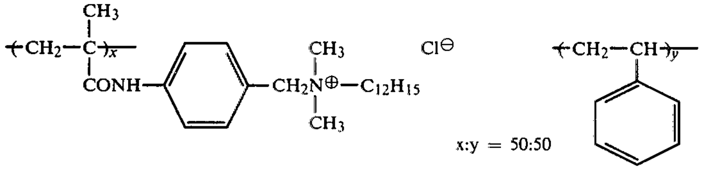
x:y = 50:50
(P-49)
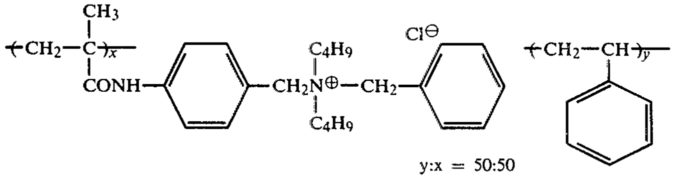
y:x = 50:50

-continued (P-50)

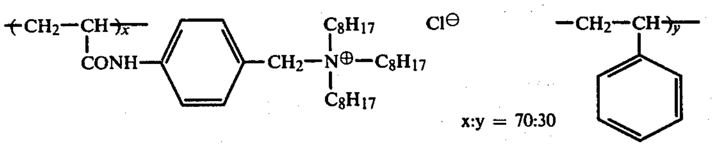

x:y = 70:30

The polymers according to this invention may easily be prepared by optionally selecting a polymerization method from bulk polymerization, solution polymerization, suspension polymerization, emulsion polymerization and the like, and the reaction conditions, in accordance with the methods described in the specifications of U.S. Pat. Nos. 3,183,219, 3,330,656 and 3,253,921, Japanese Patent Publication No. 560/1972; in Journal of Applied Polymer Science, Vol. 9, page 903 (1965), ibid., Vol. 10, page 1462 (1972); in W. R. Sorenson, T. W. Cambell, "Preparative Methods of Polymer Chemistry" (John Wiley & Sons Inc., New York, 1961); in Research Disclosure No. 14103; and so on.

There are two methods for the preparation of a polymer containing therein a quaternary ammonium salt group, i.e., (1) a method in which a monomer containing a quaternary ammonium group in the molecule is subjected to polymerization and (2) a method in which a monomer having a group which can be converted after polymerization into a quaternary ammonium group is subjected to polymerization and the resulting polymer is then subjected to polymer reaction to form quaternary ammonium substituents in the polymer molecules.

Methods (1) and (2) may be illustrated by the following equations.

Method (1):

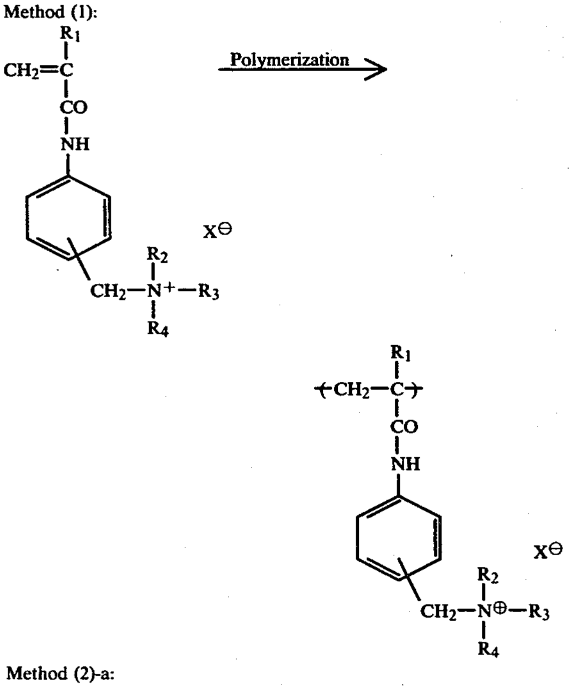

Method (2)-a:

-continued

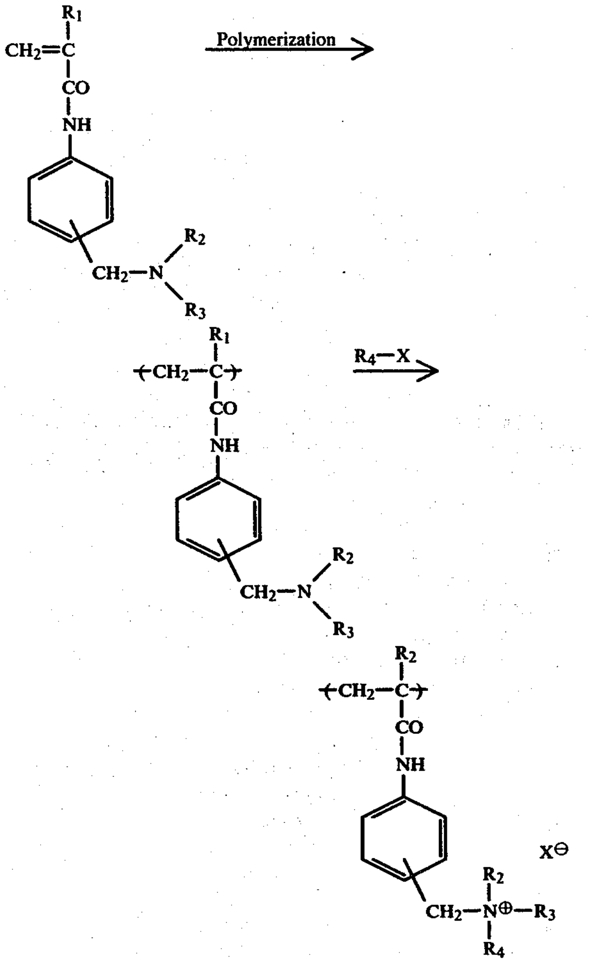

Method (2)-b:

(IV)

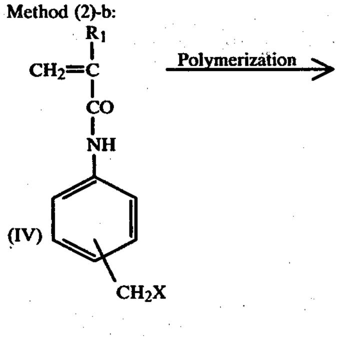

-continued

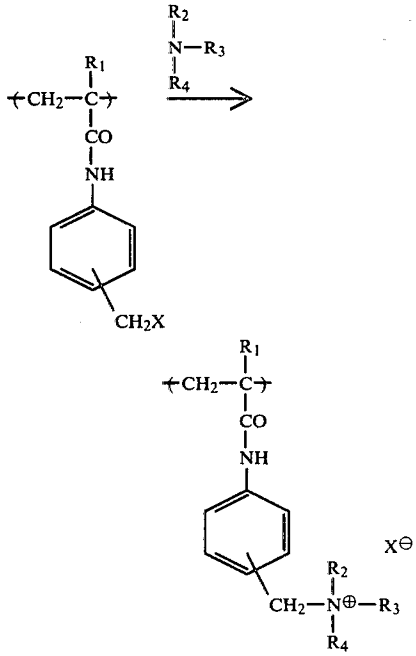

In the above formulae, $R_1$, $R_2$, $R_3$, $R_4$ and X have the same meanings as defined previously.

As the methods for preparing such water-dispersible polymers exemplified as P-21 through P-41, there have been well-known, for example, a method in which a monomer having a halogenated alkyl group in the molecule as described in the specification of U.S. Pat. No. 3,958,995, a monomer having at least two ethylenically unsaturated groups and a monomer having an $\alpha,\beta$-ethylenically-unsaturated group are subjected to emulsion polymerization and then a tertiary amine is reacted with the thus obtained polymer; and a method in which, by using a monomer having a tertiary amino group in place of the above-mentioned halogenated alkyl group, emulsion polymerization is carried out and then a quaternizing agent is reacted with the thus obtained polymer. In cases where the former method is applied, unreacted tertiary amine remains, which causes repelling phenomenum in coating adversely and affects the photographic characteristics.

The water-dispersible polymer according to this invention may advantageously be prepared according to the latter method in view of the photographic properties. Namely, the polymer of this invention can easily be obtained by emulsion-polymerizing a monomer of the formula:

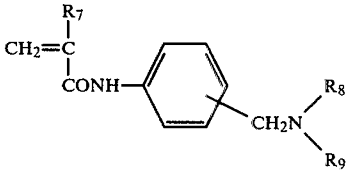
(IV)

wherein $R_7$, $R_8$ and $R_9$ have the same meanings as defined above, with a copolymerable monomer having at least two ethylenically unsaturated groups and a copolymerizable $\alpha,\beta$-unsaturated monomer and then subjecting the thus obtined intermediate to reaction with a quaternizing agent.

The monomer used for emulsion polymerization may preferably be in a state of liquid generally in the reaction system in the range of polymerization temperature. Even when the monomers are in a state of liquid, the emulsion polymerization requires different emulsifying agents, polymerization processes and so on depending upon the different hydrophilicities of the monomers. When the hydrophilicity of a monomer is too high, the polymerization stability during emulsion polymerization is bad and a water-dispersible polymer is difficult to be produced. Therefore, there must be taken into consideration such factors as hydrophilicity, copolymerizability, heat-stability, reactivity and the like of the monomers in addition to the melting points of the same.

The above-mentioned monomers represented by the formula (IV) are excellent in these points.

The emulsion polymerization mentioned above generally is carried out in the presence of an anionic surfactant and a polymerization initiator. As the anionic surfactants may be mentioned, for example, sodium laurylsulfate, sodium salt of a sulfated condensate of an alkylphenol and ethylene oxide, e.g., Triton 770 available from Rohm & Haas Co., Ltd. and so on.

As a preferred example of the polymerization initiator may be mentioned an alkali metal salt of azobiscyanovaleric acid.

In the practical system of emulsion polymerization, azobiscyanovaleric acid may be added together with an alkali such as potassium hydroxide and sodium hydroxide. It is sufficient to add an alkali in an amount which is only necessary for neutralizing the acid part of azobiscyanovaleric acid. However, it may be added in excess. The excess amount of an alkali neutralizes the sulfuric acid orgiginated from the decomposed products of the surfactant and lessen the influence thereof upon the tertiary amine. The redox system free radical initiators described in the specification of U.S. Pat. No. 3,958,995, e.g., sodium persulfate-potassium bisulfite, ammonium persulfate-sodium bisulfite, and hydrogen peroxide-$Fe^{2+}$ are not preferable in view of the stability, coloring property, etc. While the temperature of emulsion polymerization can not be uniformly fixed as it depends on the properties of the monomers to be used, it may preferably be a temperature at which the polymerization system is in a state of liquid and the polymerization mixture can easily be dispersed. It is usually in the range of 65° to 90° C., preferably of 70° to 85° C. The quaternization is a polymer reaction by which a tertiary amino group at the side chain is reacted with a quaternizing agent. The quaternizing agent may preferably be a compound represented by the formula:

$$R_{10}—X$$

wherein $R_{10}$ has the same meaning as defined above and X represents a group which can be converted into an anion $X^{\oplus}$.

In the quaternization reaction, it is preferable to add an auxiliary solvent to promote the reaction in cases where a quaternizing agent having strong hydrophobicity, e.g., benzyl chloride, is used.

The auxiliary solvents are preferably water-miscible and capable of penetrating into the polymer particles.

Alcohol group solvents such as methanol, isopropanol, 2-methoxyethanol and the like described in the specification of U.S. Pat. No. 3,958,995 not only are unpreferable as an auxiliary solvent but also decrease remarkably the dispersion stability of the polymer according to this invention and accelerate the gellation.

As the preferred examples of the auxiliary solvents according to this invention, there may be mentioned for example, acetonitrile, diglyme and so on. Acetonitrile is the most preferable one. The quaternization proceeds in the range of −20° to 150° C. As water is a main solvent, the quaternization may be carried out at 40° to 80° C., preferably 50° to 70° C. The quaternization belongs to a reaction which is generally referred to as "polymer reaction" which actually does not proceed completely. Usually, rate of the quaternization ranges from about 80% to about 95%.

The unquaternized part is a stable enough not to suffer from hydrolysis with alkali, and crosslinkable with a binder by using a hardener such as a bisalkane and a bisarenesulfonate as described in the specification of U.S. Patent No. 3,859,096 to inhibit strongly the migration of the mordant itself to other layers.

The layer containing the polymer according to this invention may preferably be used as an image receiving layer in a photographic element for the color diffusion transfer process. This photographic element comprises a support and a layer containing the polymer according to this invention. The photographic element according to this invention can be prepared by coating a polymer composition containing the polymer according to this invention on a support on which a neutralizing layer containing an acidic substance and a timing layer have been coated in order or may be coated directly on a support on which such neutralizing layer and timing layer have not been coated. In case that the polymer is a water dispersible polymer represented by formula (II), it is preferable to coat on a support (which may preliminarily have a neutralizing layer, a timing layer, etc.) a substantially aqueous dispersion of the water-dispersible polymer which includes the units represented by general formula [I] mentioned above. "Water-dispersible polymer" mentioned herein means a polymer which can be seen to be in particulate dispersion form when examined under an electron microscope, although which appears as a clean or only slightly cloudly solution on visual inspection.

Further, "substantially aqueous" means that the main portion of the dispersion medium of the dispersion is water, usually not less than 90% by weight, preferably not less than 95% by weight of water. As the other component of the dispersion medium than water, there may be used a hydrophilic organic solvent such as methanol, ethanol, methylcellosolve, dioxane, N,N-dimethylformamide and the like in single or in combination.

The polymer of this invention may be incorporated in an image receiving layer in combination with other polymeric mordants. Polymeric mordants other than the polymer of this invention, being selected optionally from the known polymeric mordants, may be used in an optional amount which do not inhibit the effect achieved by the polymer according to this invention.

The polymer according to this invention may provide good film forming property not only by itself but also in combination with other binders, preferably a binder composed of a water-miscible hydrophilic organic colloid. As the suitable binders, there may be mentioned film-forming compounds such as gelatin, gelatin derivatives, e.g., an acid-treated gelatin etc., polyvinyl alcohol, carboxymethylcellulose, hydroxyethylcellulose, starch, polyvinyl methyl ether, polyacrylamide, polyvinylpyrolidone and so on. While these compounds may be used in an optional mixing ratio when used in combination with the polymer according to this invention, the content of the latter in an image receiving layer may preferably be in the range of 10 to 100% by weight.

The thickness of the image receiving layer containing the polymer according to this invention may be varied depending upon the purpose and may most appropriately be around 3 to 10μ.

Besides the above-mentioned polymeric mordants, there may be incorporated in the image receiving layer various additives which may usually be used in photographic techniques, such as a ultraviolet ray absorber, a fluorescent brightening agent and so on.

While a photographic element comprising a support and an image receiving layer containing the polymer according to this invention may be used in various photographic materials which have hitherto been known (e.g., photographic materials for color diffusion transfer process, dye inhibition printing blanks for dye transfer process, etc.), it may preferably be used as a photographic element of the photographic material for color diffusion transfer process.

The color diffusion transfer photographic material comprises the first support having thereon an image receiving layer containing the polymer according to this invention; at least one light-sensitive silver halide emulsion layer having associated therewith an image dye-providing material; and a processing sheet or the second support. Said image receiving layer and said emulsion layer may be in the state of being superposed one upon another during processing. Before or after processing, they may or may not be superposed one on the other. Said silver halide emulsion layer may be coated on the first support having said image receiving layer as a layer constituting the photographic element according to this invention or may be coated on the second support. In cases where said emulsion layer is coated on the first support, it may be located between the first support and said image receiving layer or at the opposite side of said image receiving layer from the first support.

In cases where the emulsion layer mentioned above is coated on the first support, a processing sheet may be superposed or adapted to be superposed during processing on a layer outermost from the first support of said photographic element.

The first of the preferable color diffusion transfer photographic materials using the photographic element according to this invention comprises (1) a photographic element comprising the first support having thereon as an essential layer an image receiving layer containing the above-mentioned polymer according to this invention; and (2) the second support having thereon at least one light-sensitive silver halide emulsion layer having associated therewith an image dye-providing material.

The second of the preferred ones comprises (1) a photographic element comprising a support having thereon as essential layers in sequence, an image receiving layer containing the polymer according to this invention and at least one light-sensitive silver halide emulsion layer having associated therewith an image dye-providing material; and (2) a processing sheet which is superposed or adapted to be superposed on the layer outermost from the support of said photographic element.

The photographic element and the color diffusion transfer photographic material according to this invention are useful further for a color diffusion transfer film unit. A color diffusion transfer film unit comprises the various color diffusion transfer photographic materials mentioned above and an alkaline processing composition containing means for discharging its content into the film unit.

In the color diffusion transfer photographic element, photographic material and film unit, there may be comprised, as occasion demands, an acidic substance-containing layer (neutralizing layer), a neutralization-rate-regulating layer (timing layer), a reflecting agent containing layer, an opacifying agent-containing layer, a peelable layer and so on.

A neutralizing layer and a timing layer are preferably located between the support and the layer containing the polymer of this invention or a silver halide emulsion, or between the support and the two layers containing said polymer and silver halide emulsion, respectively, in the order of the neutralizing layer and the timing layer from the side of the support.

In cases where a neutralizing layer and a timing layer exist in the processing sheet mentioned above, they may preferably be located in the order of the neutralizing layer and the timing layer from the side of the support of the processing sheet.

A reflecting agent-containing layer and an opacifying agent-containing layer may preferably be located on a support having thereon both of a layer containing the polymer according to this invention and a silver halide emulsion layer in the order of the layer containing said polymer, the reflecting agent-containing layer, the opacifying agent-containing layer and the emulsion layer.

A peelable layer may preferably be located on a support having both of the layer containing the polymer according to this invention and the silver halide emulsion layer between the layer containing said polymer and said emulsion layer.

As the color diffusion transfer photographic element, photographic material and film unit according to this invention, there may more preferably be mentioned, respectively, I(1) a photographic element comprising the first support, preferably a transparent one, as essential layers thereon in the order, a neutralizing layer, a timing layer and a layer containing the polymer according to this invention;

(2) a photographic material comprising said photographic element and the second support, preferably an opaque support having thereon as an essential layer at least one light-sensitive silver halide emulsion layer as a necessary layer having associated therewith an image dye-providing materials; and (3) a film unit comprising said photographic material and means for containing alkaline processing composition comprising a reflecting agent and an opacifying agent which is adapted to discharge the contents between the above-mentioned layer containing the polymer and the emulsion layer mentioned above.

Another preferred examples of photographic element, photographic material and film unit respectively are II(1) a photographic element comprising on a support, preferably a transparent one, as essential layers in sequence an image receiving layer containing the polymer according to this invention, a reflecting agent-containing layer, an opacifying agent-containing layer and at least one light-sensitive silver halide emulsion layer having associated therewith an image dye-providing material;

(2) a photographic material comprising said photographic element and a processing sheet, comprising a support preferably a transparent one, having thereon as an essential layers in sequence neutralizing layer and a timing layer; and (3) a film unit comprising said photographic material and means for containing an alkaline processing composition comprising an opacifying agent which is adapted to discharge its contents between the timing layer and the emulsion layer mentioned above.

As the image dye-providing material which is used in association with a silver halide emulsion layer, there may be used various known ones no matter whether it is substantially diffusible or not in the presence of an alkaline processing composition. The first representative image dye-providing material is a so-called dye developer. A dye developer is a compound which has both a moiety of dye or dye-precursor and a moiety of silver halide developing agent in the same molecule, and the diffusibility of which is changed as a result of the oxidation by silver halide of the dye developer as an image dye-providing material.

The second representative image dye-providing material which is substantially non-diffusible, is a so-called diffusible-dye-releasing coupler which releases a diffusible dye or dye-precursor by coupling with the silver halide dye developing agent oxidized with silver halide.

The third representative image dye-providing material, which is substantially non-diffusible alkalicleavable upon oxidation to release a diffusible dye or dye-precursor in an alkaline medium (Dye Releasing Redox Compounds, referred to as "DRR compounds" hereinafter).

The fourth representative one is a substantially non-diffusible image dye-providing material in which the release of a diffusible dye or dye-precursor is inhibited in an alkaline medium by the reaction with the oxidation product of silver halide developing agent.

In cases where the third image dye-providing material, i.e., a DRR compound is used, a latent image is formed in the light-sensitive silver halide emulsion layer by the exposure to light and then processed with an alkaline processing composition in the presence of a silver halide developing agent. As a result of the processing the DRR compound mentioned above is oxidized by the oxidation product of the silver halide developing agent to release a diffusible dye or dye-precursor. The diffusible dye or its precursor released from the DRR compound is transferred by diffusion to the image receiving layer mentioned above to form a dye image.

In cases where the fourth image dye-providing material is used, a latent image is formed in a silver halide emulsion layer by the exposure to light and then processed with an alkaline processing composition in the presence of a silver halide developing agent. As a result of the processing with the alkaline processing solution mentioned above, the release of a diffusible dye or dye-precursor from the non-diffusible image dye-providing material is inhibited by the reaction of an oxidation product of the silver halide developing agent with the non-diffusible image dye-providing material mentioned above. On the other hand, in the place where the oxidation product of the silver halide developing agent is not formed, a diffusible dye or dye-precursor is released from the non-diffusible image dye-providing material to be transferred by diffusion to the image receiving layer mentioned above to form a dye image.

The polymer according to this invention shows excellent mordantability especially for an acidic dye or dye-precursor. The acidic dye or dye-precursor has an acidic group such as a sulfone group, a carboxyl group, an ionizable sulfamoyl group or a hydroxyl group substituted on an aromatic hydrocarbon or heterocyclic ring, and the like.

While various image dye-providing material may be used, as mentioned above, in the photographic material according to this invention, it is preferable to use a substantially image dye-providing material, particularly a DRR compound which provides a diffusible dye or dye-precursor having an ionizable sulfamoyl group as a result of the processing with an alkaline processing composition.

In cases where the first or fourth representiative image dye-providing material mentioned above is used, a positive diffusion transfer dye image is given by the use of a negative type silver halide emulsion layer. On the contrary to that, in cases where the second or third representative image dye-providing material mentioned above is used, a negative diffusion transfer dye image is given by the use of a negative type silver halide emulsion layer.

In order to obtain a positive type diffusion transferred dye image by the use of the second or third representative image dye-providing material reversal development is necessarily conducted. For instance, a direct-positive type emulsion, i.e., an internal latent image type emulsion and a fogged type emulsion may be used for this purpose. The object may also be attained by locating a layer containing an image dye-providing material and physical development nuclei adjacent to a negative type silver halide emulsion layer and by processing it with a developer containing a solvent for silver halide.

The object may also be attained by locating a layer containing an image dye-providing material and a self-reducible metal salt adjacent to a negative type silver halide emulsion layer containing a compound which releases such a development inhibitor as 1-phenyl-5-mercaptotetrazole by reaction with the oxidation product of a developing agent. According to the present invention, the combination of these emulsion and image dye-providing materials may be employed and thus the system which gives a negative or positive dye image may optionally be selected. The image dye-providing material used in this invention, having been dispersed preferably in a hydrophilic colloid such as gelatin, polyvinyl alcohol, etc., may be incorporated in a silver halide emulsion layer or preferably in an adjacent layer located at the opposite side of the exposure side of said emulsion layer. While the amount of the image dye-providing material to be used in this invention may be varied widely depending upon the material to be used and the result to be desired, it is preferable to use it, for example, in a ratio of silver halide to the material ranging from 50 to 1 to 1 to 2.

In cases where the substance to be transferred to the image receiving layer is a dye-precursor such as a Leuco dye and a coupler, it is preferable to incorporate, for example, an oxidizing agent, a color developing agent, a diazonium compound, etc., in the image receiving layer in order to convert such precursors into dyes. The image receiving layers containging an oxidizing agent, a color developing agent, a diazonium compound or the like are disclosed in U.S. Pat. Nos. 2,647,049, 2,698,798 and 3,676,124; French Pat. Nos. 2,232,776 and 2,232,777; Japanese Laid Open to Public Patent Publication No. 80131/1975; and so on.

The silver halide emulsion to be used in this invention may be composed of a colloidal dispersion or the like of silver chloride, silver bromide, silver chlorobromide, silver iodobromide, silver chloroiodobromide or a mixture thereof.

In the silver halide emulsion used in this invention may be incorporated a spectral sensitizing dye to impart an additional light-sensitivity to the emulsion.

In order to obtain multiple color images, it is desirable to locate a blue sensitive silver halide emulsion layer, a green sensitive silver halide emulsion layer and a red sensitive silver halide emulsion layer in the same order mentioned. Each emulsion layers may desirably have associated therewith a yellow-image dye-providing material a magenta-image dye-providing material and a cyan-image dye-providing material respectively. Between the units of each silver halide emulsion layer having associated therewith these image dye-providing materials may preferably be located an intermediate layer. The intermediate layer prevents undesirable interaction between the units of emulsion layer having associated therewith an image dye-providing material, which units are different in spectral sensitivity, and regulates the diffusibility of a diffusible dye or dye-precursor, or an alkaline processing composition.

As the reflecting agent and the opacifying agent incorporated in the reflecting agent-containing layer and the opacifying agent-containing layer respectively, there may be used similar ones as used in the alkaline processing composition which will be mentioned hereinbelow.

The photographic element and the photographic material according to this invention may comprise, if desired, a yellow filter layer, an antihalation layer, a protective layer and so on.

As the neutralizing layer to be used in this invention, there may be used any one which contains an acidic substance (a neutralizing agent) to lower the pH value in the system after processing. As the materials used as a neutralizing agent, there may preferably be employed a film-forming polymeric acid having carboxyl groups, sulfonic acid groups or groups which produce carboxyl groups by hydrolysis. Any such polymeric acid may be used in this invention. The timing layer mentioned above controls the lowering of the pH by the neutralizing such that the desired dye image can be formed. Namely, it prevents undesirable decrease of the density of the transferred image which would be caused by the early lowering of the pH value in the system before the desired development of the silver halide and the desired formation of a transferred image.

For the support or the processing sheet according to this invention, there may desirably be used a flat and even material which does not suffer remarkable change in its dimension from the processing composition during processing.

In order to prevent the reflection of light during exposure or observation of the photographic image, the support may have such a reflection-preventing layer as described in the specifications of U.S. Pat. Nos. 3,793,022 and 4,047,804, or the surface of the support may be made to be uneven as described in the specification of U.S. Pat. No. 4,040,830.

The layers through which are permitted the processing composition to permeate, such as a silver halide emulsion layer, a layer containing an image dye-providing material, a reflecting agent-containing layer, an opacifying agent-containing layer, a protective layer and the like may desirably be incorporated with a hydrophilic polymer as a binder. As the polymer may be mentioned, for example, gelatin, a gelatin modified by an acylating agent or the like, a gelatin graft-polymerized with a vinyl polymer, proteins such as casein and albumin, cellulose derivatives such as hydroxyethylcellulose, hydroxypropylcellulose, methylcellulose, carboxymethylcellulose or the like, polyvinyl alcohol or a partial hydrolysate of polyvinyl acetate, polyvinyl pyrrolidone, polyacrylamide, polyvinyl ethers, polymethyl vinyl ether, an anionic synthetic polymer such as a polyacrylic acid, a partial hydrolysate of polyacrylamide, a copolymer of vinyl methyl ether and maleic acid, or the like.

These hydrophilic polymers may be used in single or in combination. Further, these hydrophilic polymer containing layers may comprise a latex polymer dispersion obtained from a hydrophobic monomer such as an alkyl acrylate, an alkyl methacrylate and the like.

The processing composition permeable layers may comprise a latex polymer dispersion mentioned above.

In each layer used in this invention, there may be incorporated, as occasion demands, a surface active agent, for example, saponin, an anionic compound such as an alkylaryl sulfonate and an amphoteric compound such as a water-soluble adduct of glycidol and an alkylphenol.

The coating compositions may be incorporated with various thickners, the surface active agents mentioned above and so on so that the coating may easily be effected. An anionic polymer such as a polyacrylamide or polyacrylic acid having high molecular weight, which shows a thickening effect by the interaction with the polymeric binder in the coating composition, may also be used effectively in this invention.

The layers in the photographic element according to this invention may be coated according to various methods, e.g., a dip-coating method, an air-knife method, a curtain coating method, an extrusion method using a hopper and so on. If desired, two or more layers may be coated simultaneously. A vacuum-deposited silver halide layer may also be applied for the present invention.

Various layers used in this invention may be hardened by using various organic or inorganic hardener in single or in combination.

Any processing composition containing components necessary for the development of a silver halide emulsion and the formation of a diffusion-transfer image may be used in this invention.

As a solvent in the processing composition may optionally be used a hydrophilic solvent such as water, methanol, methyl cellosolve or the like. Said processing composition may desirably be incorporated with a sufficient amount of an alkaline agent for maintaining the pH value necessary for the development of the emulsion layer, for neutralizing the acid which is formed during various processes for the development and for transferring image dyes to the image receiving layer. The processing composition may contain, as occasion demands, a light-reflecting agent such as titanium dioxide, barium sulfate, zinc oxide, alumina, barium stearate, calcium carbonate, a silicate, zirconium oxide, caolin, magnesium oxide and the like, an opacifying agent such as carbon, a pH-indicator dye as described in the specification of U.S. Pat. No. 3,647,437, a silver halide developing agent, for example, a 1-phenyl-3-pyrazolidone such as 1-phenyl-4-hydroxymethyl-4-methyl-3-pyrazolidone, a p-phenylene-diamine such as N,N-diethyl-p-phenylenediamine, a hydroquinone such as hydroquinone and the like depending upon the image dye-providing material used.

The above mentioned processing composition containing means is preferably a rupturable container, which is prepared hollow inside by folding a sheet made of a material having no permeability to air and then sealing each edge. It is desirable that the container which is filled with a processing composition is ruptured at a predetermined position by the inside pressure applied when passed through a pair of pressure applying members and discharge the processing composition.

In the present invention, a layer containing a light-reflecting agent may desirably be located to form a white background for the image formed in the image receiving layer. Examples of suitable light-reflecting agents are mentioned above.

While the polymer according to this invention is used mainly as a mordant in an image receiving layer for the color diffusion transfer process as explained hereinbefore, it can also be used as a scavenger which prevents the increase of the minimum density of the transferred image and the formation of stains, which are caused by the transfer of an excess amount of a diffusible dye or dye-precursor, or impurities to the image receiving layer, the transfer thereof being undesirable for the formation of a transferred image. When used as a scavenger, the above mentioned polymer is incorporated in a photographic material, preferably in a layer which is located at the opposite side of the silver halide layer from the image receiving layer or which is located between the silver halide emulsion layer and the image receiving layer. It may be added to various layers, e.g., a timing layer, an intermediate layer and a protecting layer, depending upon the layer arrangement. Further, a scavenger layer containing said polymer may also be located separately, for example, between a timing layer and a neutralizing layer, or between an opacifying agent-containing layer and the silver halide emulsion layer. In cases where said polymer is used as a scavenger, a mordant in the image receiving layer may or may not be said polymer. The amount of the polymer according to this invention which is to be used as a scavenger may preferably be 0.2 to 3 g./$m^2$ in cases where the polymer is added to a layer located at the opposite side of the silver halide layer from the image receiving layer, as mentioned above, and the amount may preferably be 20 to 160 mg./$m^2$ in cases where the polymer is added to a layer located between the silver halide emulsion layer and the image receiving layer.

The polymer according to this invention can be used not only for the color diffusion transfer process but also for the dye transfer process such as the wash-off relief process. Namely, an excellent image can be obtained by transferring dyes from the matrix of the dye transfer process onto a photographic element comprising a support and a layer containing the polymer according to this invention.

As the dyes in the dye transfer process, there may be mentioned Pontacyl green SN Ex (Color Index 737), Tartrazin (Color Index 640), Acid Magenta O (Color Index 692) and so on.

Further, the polymer according to this invention can also be used in a light-filtering layer, e.g., a anti-halation layer as described in the specification of U.S. Pat. No. 3,282,699. The light-filtering layer may preferably contain the polymer according to this invention, a filter dye mordanted by said polymer and a hydrophilic binder.

The present invention will be explained in more detail by way of the following Synthesis examples and Examples, which however should not be construed to limit the present invention.

SYNTHESIS A

[Synthesis of N,N-dimethyl-N-benzyl-N-(p-acryloylaminophenyl)-methyl ammonium chloride]

In a 5 l four-necked flask were placed 123.1 g. (1.0 mol.) of p-aminobenzyl alcohol which had been obtained by reducing p-nitrobenzyl alcohol, 111.3 g. (1.1 mol.) of triethylamine and 2 l of acetone. After cooling the mixture to −5° C. with stirring, a mixture of 95.0 g. (1.05 mol.) of acrylic acid chloride and 1 l of acetone was added dropwise thereto over 2 hours. At that time, the temperature in the flask was kept at 0°±2° C. After completion of the dropwise addition, the resulting mixture was subjected to reaction further for one hour. After the hydrochloride of triethylamine precipitated in the reaction mixture was removed by filtration and the acetone was distilled off under reduced pressure, a mixture of 2 l of pure water, 0.6 l of methanol and 20 g. of anhydrous sodium carbonate was added to the residue, and the resulting mixture was stirred for 45 minutes at 45° to 40° C. Thereafter, the methanol was removed by distillation under reduced pressure. The residue thus obtained was adjusted to pH 6 to 7 with 4 N hydrochloric acid, and filtered at 60° C. to collect crystalline Product (I) melting at 110° to 111.5° C.

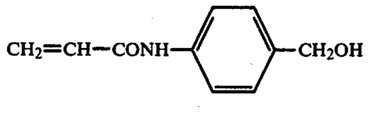

In a 3 l four-necked flask were placed 124.0 g. (0.7 mol.) of product (I), 700 ml of chloroform and 1 ml of pyridine and the mixture was cooled with ice to around 5° C. with stirring. To the mixture was added dropwise a mixture of 350 ml of chloroform and 104.0 g. (0.87 mol.) of Thionyl chloride over one hour. At this time, the reaction temperature was kept at below 10° C. After completion of the dropwise addition, the temperature was gradually raised and the mixture was subjected to reaction further for 3 hours under reflux. After cooling and filtration under reduced pressure, the crude product thus separated was recrystallized, after addition thereto of 1,400 ml of a mixed solvent of chloroform and acetone (1:1, volume ratio) and 0.2 g. of p-methoxyphenol, to give product (II) melting at 165.5° to 167.5° C.

Product (II):

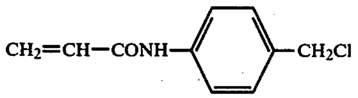

In a 1 l three-necked flask were placed 68.5 g. (0.35 mol.) of Product (II), 700 ml of acetone and 0.35 g. of p-methoxyphenol and the mixture was stirred under heating. After dissolution of product (II), 71.0 g. (0.525 mol.) of N,N-dimethylbenzylamine was added thereto and the resulting mixture was refluxed for 4 hours. The desired monomer containing a quaternary ammonium salt moiety was precipitated immediately after its formation. After cooling, the precipitates were collected by filtration, washed with acetone and then dried to give Product (III) melting at above 260° C.

Product (III):

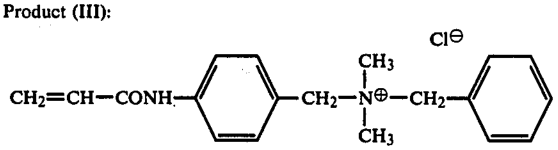

Elementary Analysis

| | C | H | N | Cl |
|---|---|---|---|---|
| Calcd. (%) | 68.97 | 7.01 | 8.47 | 10.72 |
| Found (%) | 68.82 | 7.12 | 8.28 | 10.43 |

Although p- and m-aminobenzyl forms of the quaternary ammonium salt may preferably be used, o-form may also be used in this invention. The o- or m-form of the monomer may be prepared in the same manner as mentioned above except that the starting material, p-nitrobenzyl alcohol is replaced with o- or m-nitrobenzyl alcohol, respectively.

In cases where $R_1$ is a methyl group, the desired monomer can be obtained in the same manner as above except that acrylic acid chloride, which was used to react with aminobenzyl alcohol, is replaced with methacrylic acid chloride.

Various monomers in which $R_2$, $R_3$ and $R_4$ are different from those of the monomer [Product (III)] mentioned above can also be synthesized by replacing the tertiary amine to be reacted with product (II) (chloride) with others.

SYNTHESIS EXAMPLE 1

Synthesis of examplified polymer (P-1)

In 150 ml of ethanol were dissolved 19.56 g. (0.1 mol.) of Product (II) (chloride), 10.41 g. (0.1 mol.) of freshly distilled styrene and 1.64 g. (0.01 mol.) of α,α'-azobisisobutyronitrile, and the mixture was introduced into a 300 ml ampoule. After replacing the air in the ampoule with nitrogen, the ampoule was heat-sealed. The mixture in the ampoule which was placed in a thermostat was subjected to reaction at 80° C. for 9 hours and then poured into acetone to precipitate a polymer which was then dried.

In a 300 ml three-necked flask were placed 10 g. (0.05 mol.) of the thus obtained polymer, 10.14 g. (0.075 mol.) of N,N-dimethylbenzylamine and 150 ml of benzyl alcohol and the mixture was subjected to reaction at 60° C. for 15 hours in a stream of nitrogen. After the resulting reaction mixture was poured into acetone, the precipitated white polymer was collected by filtration and dried to give a polymer having an average molecular weight of about 68,000.

| Elementary Analysis: | C | H | N | Cl |
|---|---|---|---|---|
| Found (%) | 74.32 | 7.21 | 6.56 | 8.28 |

The procedure mentioned above is an example of procedures in which polymers obtained by polymerization of monomers having a precursor group for a quaternary ammonium salt group are quaternized by polymer reaction.

| Elementary Analysis: | C | H | N | Cl |
|---|---|---|---|---|
| Found (%) | 74.32 | 7.21 | 6.56 | 8.28 |
| M.W. | 68,000 | | | |

SYNTHESIS EXAMPLE 2

Synthesis of exemplified polymer (P-5)

In 150 ml of ethanol were dissolved 16.54 g. (0.05 mol.) of Product (III) (a monomer containing a quaternary ammonium salt moiety) obtained in Synthesis A, 7.1 g. (0.05 mol.) of n-butyl methacrylate and 0.82 g. (0.005 mol.) of $\alpha,\alpha'$-azobisisobutyronitrile, and the mixture was introduced into a 300 ml ampoule. After replacing the air in the ampoule with nitrogen, the mixture was subjected to polymerization reaction at 80° C. for 15 hours.

After reaction, the resulting reaction mixture was poured into an excess amount of acetone and the precipitated white substance was collected by filtration and dried to give a polymer having an average molecular weight of 12,500.

| Elementary Analysis: | C | H | N | Cl |
|---|---|---|---|---|
| Found (%) | 70.87 | 8.23 | 6.05 | 7.56 |

SYNTHESIS EXAMPLE 3

Synthesis of N,N-dimethyl-p-nitrobenzylamine

To 3 l of ethanol was added 750 ml of a 40% aqueous solution of dimethylamine and 500 g. of p-nitrobenzyl chloride was added gradually thereto with stirring. After complete dissolution, the reaction was carried out at 40° C. for 10 hours. After the reaction mixture was concentrated by distilling off the ethanol, the residue was extracted with ethyl acetate. The extract was dried over anhydrous magnesium sulfate and concentrated by distilling off the ethyl acetate. The residue thus obtained was distilled under reduced pressure to give a yellow liquid which was the desired product boiling at 102° to 104° C./2 mmHg.

Yield: 890 g. (85%)

| Elementary Analysis: | C | H | N |
|---|---|---|---|
| Calcd. (%) | 72.97 | 8.11 | 18.92 |
| Found (%) | 72.83 | 8.65 | 18.52 |

SYNTHESIS EXAMPLE 4

Synthesis of p-dimethylaminomethylaniline

In a 30 l autoclave was placed a suspension in which 10 g. of a palladium-carbon catalyst was suspended in 50 ml of ethanol, and 890 g. of N,N-dimethyl-p-nitrobenzylamine and 10 l of ethanol were charged thereinto. Then, hydrogenation was carried out at 35° C. under 30 atm., and when the consumption of hydrogen was ceased, the reaction mixture was taken out of the autoclave. After the palladium-carbon was removed by filtration and the ethanol was removed by distillation to concentrate the filtrate, the resulting residue was distilled under reduced pressure to give a light-yellow liquid which was the desired product boiling at 105° to 108° C./2 mmHg. Yield: 675 g. (90%)

| Elementary Analysis: | C | N | H |
|---|---|---|---|
| Calcd. (%) | 72.00 | 18.67 | 9.33 |
| Found (%) | 72.12 | 18.54 | 9.34 |

SYNTHESIS EXAMPLE 5

Synthesis of N-(para-N,N-dimethylaminomethylphenyl)methacrylamide

In a 5 l three-necked flask were placed 1 l of water and 225.5 g. of sodium acetate. After dissolution of the sodium acetate with stirring, the resulting solution was cooled on an ice bath and 375 g. of p-dimethylaminomethylaniline and 400 ml of acetic acid were added thereto. The resulting mixture was cooled until the temperature became below 10° C. To the cooled mixture was added dropwise 287.4 g. of methacrylic acid chloride gradually to the extent that the temperature in the flask might not exceed 10° C. After completion of the dropwise addition, the stirring was continued for 30 minutes at the same temperature, followed by further stirring for 2 hours without the ice bath. To the reaction mixture thus obtained were added 500 ml of ethyl acetate and a solution of 400 g. of sodium hydroxide in 600 ml of water and the resulting mixture was extracted with ethyl acetate. After the extract was dried over anhydrous magnesium sulfate, the ethyl acetate was removed by distillation. The residue was dissolved in 300 ml of benzene and poured into 3.2 l of cooled n-hexane to precipitate the desired product. White crystal mp.(melting point): 65.5° C.

Yield: 435 g. (80%)

| Elementary analysis: | C | N | H |
|---|---|---|---|
| Calcd. (%) | 71.56 | 12.84 | 8.26 |
| Found (%) | 71.32 | 12.93 | 8.38 |

SYNTHESIS EXAMPLE 6

Synthesis of an intermediate latex, poly-(styrene-co-N-p-N',N'-dimethylaminomethylphenylmethacrylamide-co-divinylbenzene In a 2 l four-necked flask fitted with a stirrer, a condenser, a thermometer and an inlet tube for nitrogen were placed 110.5 g. of the monomer obtained in Synthesis example 5, 1200 ml of a deaerated water and 28.7 ml of Trax H-45 (Sodium salt of a sulfated condensate of an alkylphenol and ethylene oxide, manufactured by Nippon Yushi Co., Ltd.) and the mixture was heated at 75° C. in a stream of nitrogen. Subsequently, 52.7 g. of styrene and 9.25 g. of divinylbenzene were added thereto and the mixture was stirred at a rotation speed of 300 rpm.

When the monomer in the flask was emulsified homogeneously, a solution of an initiator, which had been obtained by dissolving 2.14 g. of azobiscyanovaleric acid and 1.80 g. of potassium hydroxide in 95 ml of an deaerated water, was added to the emulsion and the resulting mixture was heated with stirring for 5 hours under the same conditions as above and then cooled to room temperature. After filtration, the desired product was obtained.

SYNTHESIS EXAMPLE 7

Synthesis of exemplified polymer (P-21)

In a 2 l four-necked flask fitted with a stirrer, a condenser, a thermometer and a dropping funnel was placed 710 ml of the intermediate polymer latex having a solid content of 11.5% which was obtained in Synthesis example 6 above, and 415 ml of a deaerated water was added thereto. The mixture thus obtained was stirred at 300 rpm while being kept at room temperature.

Subsequently, 365 ml of acetonitrile was added thereto over one hour and 30.9 g. of benzyl chloride was added further over 10 minutes. After stirring at 60° C. for 6 hours, the mixture was cooled to room temperature and was filtered to give the latex of exemplified polymer (P-21) having a solid content of 7.4% and showing a viscosity in solution of 7.5 cps (measured by means of Brookfield rotational viscometer).

| | | | |
|---|---|---|---|
| Ratio of feed monomers: | | | |
| x | y | z | |
| 4 | 48 | 48 | |
| Elementary Analysis: | | | |
| C | H | N | Cl |
| 75.27 | 7.45 | 6.21 | 7.86 |

SYNTHESIS EXAMPLE 8

Synthesis of exemplified polymer (P-26)

A. Synthesis of intermediate latex

In a 2 l four-necked flask fitted with a stirrer, a condenser, a thermometer and a gas inlet tube for nitrogen, were placed 930 ml of a deaerated water and 22.2 ml of Trax H-45, and 81.71 g. of N-(N',N'-dimethylaminomethylphenyl)acrylamide (Molecular weight: 204.27, a mixture of m- and p-forms, bp: 182.5° C./1.4 mmHg.), 41.66 g. of styrene and 2.13 g. of divinylbenzene were added thereto. The temperature of the mixture was raised upto 85° C. and the stirring was conducted at 300 rpm in a stream of nitrogen. When the monomers in the flask were emulsified homogeneously, a solution of an initiator, which had been obtained by dissolving 1.77 g. of azobiscyanovaleric acid and 1.49 g. of potassium hydroxide in 35 ml of a deaerated water, was added thereto. After the mixture was subjected to reaction for 5 hours while maintaining the mixture at the same temperature, it was then cooled to room temperature and filtered off to give the desired product.

B. Quaternization

In a 2 l four-necked flask fitted with a stirrer, a condenser, a thermometer and a dropping funnel, was placed 710 ml of the above-mentioned intermediate latex having a polymeric solid content of 11.5%, and 415 ml of a deaerated water was added thereto. The mixture was stirred at 300 rpm without raising the temperature.

Then, 365 ml of acetonitrile was added dropwise thereto over one hour and further 32.9 g. of benzyl chloride was added thereto over 10 minutes. After completion of the dropwise addition, the mixture was stirred continuously at 60° C. for 6 hours and cooled to room temperature. The latex of exemplified polymer (P-26) having a polymeric solid content of 7.4% and a viscosity of 6.3 cps (measured by means of Brookfield rotational viscometer) was obtained by filtration.

| | | | |
|---|---|---|---|
| Ratio of feed monomers: | | | |
| x | y | z | |
| 4 | 48 | 48 | |
| Elementary Analysis: | | | |
| C | H | N | Cl |
| 74.10 | 7.19 | 0.33 | 7.80 |

SYNTHESIS EXAMPLE 9

Synthesis of exemplified polymer (P-31)

A. Synthesis of intermediate latex

In a 2 l four-necked flask fitted with a stirrer, a condenser, a thermometer and a nitrogen-gas inlet tube, were placed 1350 ml of a deaerated water, 324 ml of Trax H-45, 123.48 g. of N-(p-N',N'-dipropylaminomethylphenyl)methacrylamide (sinthesized in the same manner as in Synthesis examples 3 to 5, molecular weight: 247.41, mp: 81.0°-82.5° C., white crystal), 46.88 g. of styrene and 8.88 g. of divinylbenzene, and the mixture was heated up to 85° C. and stirred at 300 rpm in a stream of nitrogen.

When the monomers were homogeneously emulsified in the flask, a solution containing an initiator, which had been obtained by dissolving 1.87 g. of α,α'-azobiscyanovaleric acid and 1.57 g. of potassium hydroxide in 35 ml of a deaerated water, was added to the emulsion to initiate the polymerization. After the resulting mixture was stirred at 85° C. at 300 rpm in a stream of nitrogen for 5 hours, it was cooled to room temperature and filtered off to give the desired product.

B. Quaternization

In a 2 l four-necked flask fitted with a stirrer, a condenser, a thermometer and a dropping funnel, was placed 710 ml of the intermediate latex mentioned above, and then 415 ml of a deaerated water was added thereto and the mixture was stirred at room temperature.

Then, 365 ml of acetonitrile was added dropwise thereto over one hour and 26.01 g. of benzyl chloride was subsequently added dropwise over 10 minutes. After completion of the dropwise addition, the mixture was heated up to 65° C. and stirred at 300 rpm for 6 hours to carry out the reaction. After completion of the reaction, the resulting reaction mixture was cooled to room temperature and the latex of exemplified polymer (P-31) having a polymeric solid content of 7.4% and a viscosity of 10.3 cps (measured by means of Brookfield rotational viscometer).

| | | | |
|---|---|---|---|
| Ratio of feed monomers: | | | |
| x | y | z | |
| 4 | 48 | 48 | |
| Elementary Analysis: | | | |
| C | H | N | Cl |
| 76.60 | 8.30 | 5.57 | 6.65 |

SYNTHESIS EXAMPLE 10

Exemplified polymers (P-22), (P-23), (P-24), (P-28), (P-30), (P-33), (P-35), (P-36), (P-37) and (P-40) were synthesized in the same manner as in Synthesis examples 3 to 7. The results of Elementary Analyses of the polymers thus synthesized were shown in Table 1.

Table 1

| exemplified polymer | ratio of feed monomers | | | elementary analysis [%] | | | |
|---|---|---|---|---|---|---|---|
| | x | y | z | C | H | N | Cl |
| (P-22) | 4 | 48 | 48 | 75.74 | 7.64 | 6.02 | 7.16 |
| (P-23) | 4 | 48 | 48 | 73.95 | 8.80 | 6.30 | 7.35 |
| (P-24) | 4 | 48 | 48 | 75.63 | 9.66 | 5.32 | 6.36 |
| (P-28) | 4 | 48 | 48 | 75.27 | 7.88 | 5.89 | 6.71 |
| (P-30) | 4 | 38 | 58 | 81.54 | 10.27 | 5.81 | 8.68 |
| (P-33) | 4 | 48 | 48 | 76.25 | 8.51 | 5.21 | 6.24 |
| (P-35) | 4 | 21 | 75 | 73.78 | 7.59 | 7.77 | 8.94 |
| (P-36) | 4 | 66 | 30 | 79.19 | 7.30 | 4.78 | 5.77 |
| (P-37) | 4 | 48 | 48 | 75.38 | 7.54 | 6.27 | 7.59 |
| (P-40) | 4 | 48 | 48 | 75.33 | 7.64 | 5.98 | 7.26 |

SYNTHESIS EXAMPLE 11

Synthesis of control polymer A

Syntheses were conducted by using a monomer of the formula

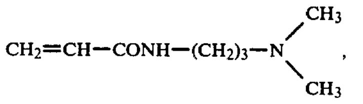

divinylbenzene and styrene in the same manner as in Synthesis examples 6 and 7. However, in the synthesis of an intermediate latex, gellation occurred about one and a half hours after starting of the polymerization and thus the desired latex failed to be obtained. Therefore, the polymerization reaction was stopped a little before the occurrence of gellation and, immediately thereafter, quaternization was carried out.

In order to remove the unreacted monomers, the formed latex was introduced in a dialysis tube and subjected to dialysis in deionized water for one week. Thus, a latex of control polymer A containing a polymeric solid content of 11.5% and having a viscosity of 18.6 cps was obtained.

Control Polymer A:

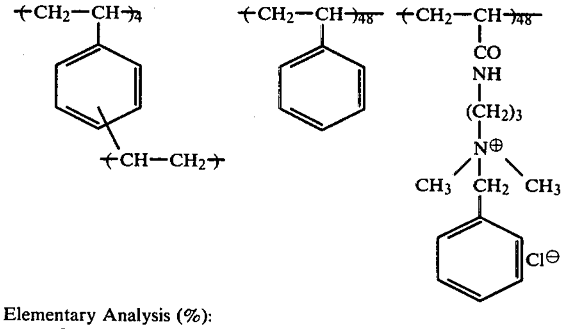

Elementary Analysis (%):

| C | H | N | Cl |
|---|---|---|---|
| 72.12 | 8.14 | 7.25 | 8.35 |

Test example (Measurement of mobility of a cationic substance)

Water was added to 8 g. of each of exemplified polymers specified in Table 1, P-21, P-26, P-31 and control polymer A, 8 g. of gelatin and 0.75 ml of a 10%-EMULGEN 108 (polyoxyethylene nonylphenyl ether, manufactured by Kao-Atlas Co., Ltd.) to make the total volume to be 250 ml. The mixture was coated on a transparent polyethylene terephthalate support of 100μ. in thickness so that the amount of the polymer and the gelatin to be coated might be 27 mg./100 $cm^2$ and 27 mg./100 $cm^2$, respectively, to prepare photographic elements I-1 to XIII-1 and A-1, respectively.

Each photographic element having an area of 100 $cm^2$. was cut off and dipped in 100 ml of deionized water for 5 minutes. After the element was taken out, several drops of a toluidine blue indicator (for use in colloid titration, manufactured by Wako-Junyaku Kogyo Co., Ltd.) were added to the said water and then the colloid titration was carried out with a 1/400 N solution of potassium polyvinyl sulfate (for use in colloid titration, manufactured by Wako-Junyaku Kogyo Co., Ltd.) to determine quantitatively cationic substances which are mobile in water.

The results are shown in Table 2.

Table 2

| photographic element | polymer | mobility of cationic substance [%] |
|---|---|---|
| I-1 | exemplified polymer (P-21) | 0.02 |
| II-1 | exemplified polymer (P-22) | 0.01 |
| III-1 | exemplified polymer (P-23) | 0.06 |
| IV-1 | exemplified polymer (P-24) | 0.03 |
| V-1 | exemplified polymer (P-26) | 0.10 |
| VI-1 | exemplified polymer (P-28) | 0.32 |
| VII-1 | exemplified polymer (P-30) | 0.02 |
| VIII-1 | exemplified polymer (P-31) | 0.00 |
| IX-1 | exemplified polymer (P-33) | 0.00 |
| X-1 | exemplified polymer (P-35) | 0.035 |
| XI-1 | exemplified polymer (P-36) | 0.015 |
| XII-1 | exemplified polymer (P-37) | 0.08 |
| XIII-1 | exemplified polymer (P-40) | 0.005 |
| A-1 (control) | control polymer A | 15.67 |

The mobility of cationic substances serves to be a measure of migration of a mordant into water. Mobility M can be determined according to the following equation:

$$M = \frac{(C - C_O) \times f \times \frac{m_O}{400 \times 1000} \times m_1}{K} \times 100$$

wherein K: amount (g.) of cationic monomer unit per 100 $cm^2$.

C: added amount of a N/400 potassium polyvinyl sulfate $C_O$: value of C against deionized water $m_O$: molecular weight of potassium polyvinyl sulfate (161.2)

$m_1$: molecular weight of cationic monomer unit f: titer

When one layer (for example, a reflective layer etc.) is coated on a mordant-containing layer, cationic polymers and/or monomers may transfer from one layer to another in a wet state. These transferred substances adsorb diffusible dyes during the process of diffusion transfer to cause such undesirable effects as the decrease of the density of an image and the changing of the density due to diffusion after dye image formation.

According to Table 2, photographic elements I-1 to XIII-1 in which mordants according to this invention are used show no or extremely low mobility of cationic substances. In contrast to that, control photographic element A-1 shows relatively high value in the mobility of the same. Therefore, the control photographic element exerts undesirable influence upon the photographic performances mentioned above.

EXAMPLE 1

According to the procedure shown in Synthesis examples 1 and 2, the polymers of this invention having the following formula, the substituents $R_1$ to $R_4$ of which are shown in Table 3, were synthesized.

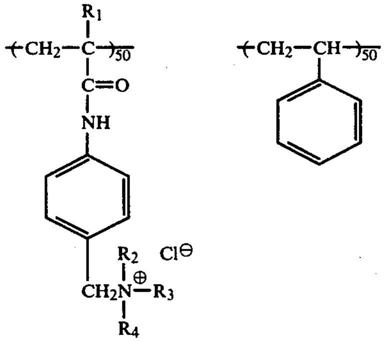

The results of the elementary analyses and the molecular weights of the polymers thus synthesized are listed in Table 3.

Table 3

| Compound No. | $R_1$ | $R_2$ | $R_3$ | $R_4$ | elementary analysis (%) C | H | N | Cl | molecular weight |
|---|---|---|---|---|---|---|---|---|---|
| (P-4) | H | $-CH_3$ | $-C_{12}H_{25}$ | $-CH_3$ | 72.80 | 9.21 | 5.33 | 6.86 | 120,000 |
| (P-7) | $-CH_3$ | $-CH_3$ | 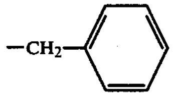 | $-CH_3$ | 74.69 | 7.26 | 6.18 | 7.77 | 56,000 |
| (P-43) | H | $-C_4H_9$ | $-C_4H_9$ | $-C_4H_9$ | 74.29 | 8.88 | 5.93 | 7.48 | 73,000 |
| (P-44) | H | $-C_6H_{13}$ | $-C_6H_{13}$ | $-C_6H_{13}$ | 74.69 | 10.21 | 4.83 | 6.27 | 59,500 |
| (P-45) | H | $-C_4H_9$ | 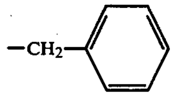 | $-C_4H_9$ | 76.47 | 8.22 | 5.61 | 6.72 | 79,000 |
| (P-46) | $-CH_3$ | $-C_4H_9$ | $-C_4H_9$ | $-C_4H_9$ | 74.73 | 9.29 | 5.84 | 7.01 | 67,000 |
| (P-47) | $-CH_3$ | $-C_6H_{13}$ | $-C_6H_{13}$ | $-C_6H_{13}$ | 77.41 | 8.69 | 4.77 | 6.25 | 10,500 |
| (P-48) | $-CH_3$ | $-CH_3$ | $-C_{12}H_{25}$ | $-CH_3$ | 74.96 | 9.62 | 5.21 | 6.53 | 69,000 |
| (P-49) | $-CH_3$ | $-C_4H_9$ | 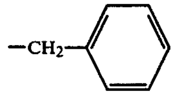 | $-C_4H_9$ | 76.66 | 8.39 | 5.38 | 6.51 | 72,500 |

Control example B: (described in U.S. Patent No. 3,709,690)

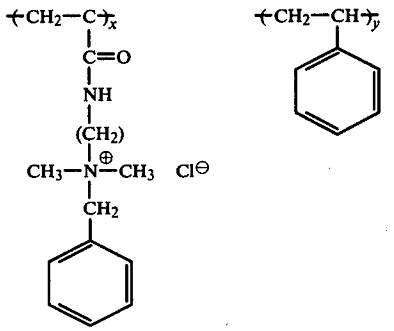

x: y=50:50 molecular weight: 65,000

A photographic elements XIV-1-XXIII-1 and Control B-1 were obtained by coating on a transparent polyethylene terephthalate support of 100μ in thickness the following layers in sequence:

(1) An image receiving layer

A layer of 4–5μ in dry thickness containing respective mordant polymer (27 mg/100 $cm^2$) shown in Table 4 and gelatin (27 mg/100 $cm^2$).

(2) A light reflecting agent containing layer

A layer of 7–8μ in dry thickness containing titanium dioxide (220 mg/100 $cm^2$) and gelatin (22 mg/100 $cm^2$).

(3) An opacifying agent containing layer

A layer of 4μ in dry thickness containing carbon black (28 mg/100 $cm^2$) and gelatin (18 mg/100 $cm^2$).

Next, the following layers were coated in order upon a transparent polyethylene terephthalate film support to obtain Sheet (A).

(1) A neutralizing layer

A neutralizing layer of 22μ in thickness containing 220 mg/100 $cm^2$ of a copolymer of acrylic acid and ethyl acrylate (ratio by weight: 75/25, average molecular weight: 70,000).

(2) A timing layer

A layer of 5.0μ in thickness containing a cellulose diacetate (degree of acetylation: 40%) (50 mg/100 $cm^2$).

(3) A dye-releasing layer

A cyan dye-releasing layer of 2.2μ in dry thickness containing a compound (0.01 mMol./100 $cm^2$) of the formula:

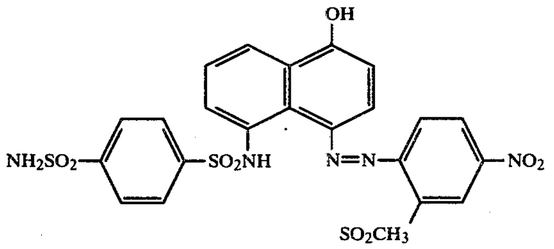

and gelatin (25.0 mg/100 $cm^2$).

The photographic element prepared above were superposed on Sheet (A) mentioned above and a container containing 1 ml of a processing composition mentioned below is positioned therebetween to prepare a light-insensitive film unit. Next, the film unit mentioned above was pass through between a pair of juxtaposed pressure rollers with a gap of about 340 nm. to rupture the container to spread its content between the opacifying agent containing layer and the dye releasing layer.

The processing composition used are as follows:

| | | |
|---|---|---|
| Potassium hydroxide | | 56 g. |
| Sodium salt of carboxymethylcellulose | | 50.0 g. |
| Distilled water | to make | 1000.0 ml |

Simultaneously with spreading thereof, reflection densities were measured with time from the side of the image receiving layer by using a red ($\lambda_{max}$=644 nm) filter and a Sakura photoelectric densitometer type PDA-60 manufactured by Konishiroku Photo Industries, Co., Ltd.

The results obtained are shown in Table 4.

Table 4

| photographic element No. | mordant polymer | $D_{max}$ | $T_{0.5}$(min.) | $D_{1\,day}$/ $D_{max}$ |
|---|---|---|---|---|
| XIV-1 | P-1 | 2.38 | 10.5 | 0.97 |
| XV-1 | P-4 | 2.28 | 10.0 | 0.97 |
| XVI-1 | P-7 | 2.32 | 9.5 | 0.96 |
| XVII-1 | P-43 | 1.99 | 11.5 | 0.94 |
| XVIII-1 | P-44 | 2.40 | 9.5 | 0.98 |
| XIX-1 | P-45 | 2.10 | 11.0 | 0.95 |
| XX-1 | P-46 | 2.06 | 12.5 | 0.91 |
| XXI-1 | P-47 | 2.35 | 9.0 | 0.99 |
| XXII-1 | P-48 | 2.39 | 10.0 | 0.97 |
| XXIII-1 | P-49 | 2.03 | 12.0 | 0.89 |
| B-1 | B | 1.80 | 17.0 | 0.36 |

In Table 4 above, Dmax (maximum transfer density) shows the maximum transfer density at a time of 60 minutes after processing, and $T_{0.5}$ shows a time required for density to reach 50% of the maximum transfer density and is a measure of the rate of the formation of dye image. $D_{1day}$ means the color density which was measured similarly after allowing to stand a photographic element at room temperature for 24 hours after processing. $D_{1day}$/Dmax is a measure of the migration of a dye after mordanted.

A good mordant is one which shows not only a strong mordanting property but also a high dye-image-formation rate, and which does not cause the desorption of dyes.

It will be understood that all the polymers disclosed in Example 1 according to this invention possess higher mordantability in comparison with control compound, have excellent dye-image-formation rates and do not cause the desorption of dyes.

EXAMPLE 2

The following layers were coated in order on the opacifying agent containing layer of photographic elements XIV-1–XXIII-1 and control photographic element B-1 to prepare a multiple-layer monochromic photographic elements XIV-2–XXIII-2 and B-2, respectively.

(1) A cyan image dye-providing material containing layer of 2.2μ in dry thickness containing DRR Compound (0.01 mMol./100 $cm^2$) of the formula:

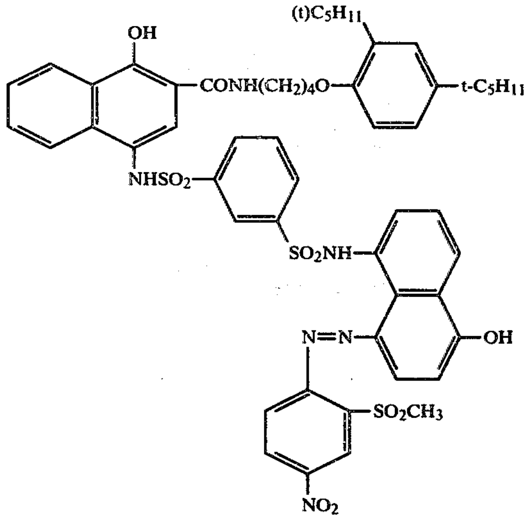

N,N-dimethyllauroylamide (11 mg/100 $cm^2$) and gelatin (25.0 mg/100 $cm^2$).

(2) A red sensitive silver halide emulsion layer of 1.5μ in dry thickness containing a red sensitive internal latent image type direct positive silver bromide emulsion (14.3 mg/100 $cm^2$ calculated on silver), potassium 2-octadecyl-hydroquinone-5-sulfonate (0.9 mg/100 $cm^2$), formyl-4'-methylphenylhydrazide (0.13 mg/100 $cm^2$) and gelatin (16.5 mg/100 $cm^2$).

(3) A protective layer of 0.7μ in dry thickness containing mucochloric acid (1.0 mg/100 $cm^2$) and gelatin (10.0 mg/100 $cm^2$).

Next, the following layers were coated in order on a transparent polyethylene terephthalate film support of 100μ in thickness to prepare a processing sheet.

(1) A neutralizing layer of 22.0μ in dry thickness containing a copolymer of acrylic acid and n-butyl acrylate (ratio by weight: 75/25, average molecular weight $\overline{M}n$=70,000) (220 mg/100 $cm^2$)

(2) A timing layer of 5.0μ in dry thickness containing cellulose acetate (degree of acetylation: 40%) (50 mg/100 $cm^2$).

Each multiple-layer monochromic photographic element thus prepared was subjected to prescribed exposure through an optical wedge having 30 steps of optical density in total with the density difference of 0.15 between one step and the next. Thereafter, the processing sheet mentioned above is superposed upon the exposed element, and a container containing 1 ml of a processing composition having the composition mentioned below was positioned between the processing sheet and the exposed element to prepare a film unit. Next, the film unit mentioned above was passed through between a pair of juxtaposed pressure rollers with a gap of about 340 nm. to rupture the container to spread its content between the protective layer and the timing layer mentioned above.

The processing composition used were as follows.

| | | |
|---|---|---|
| Potassium hydroxide | | 56 g |
| Sodium sulfite | | 2.0 g |
| 4-Hydroxymethyl-4-methyl-1-phenyl-3-pyrazolidone | | 8.0 g |
| 5-Methylbenzotriazole | | 2.8 g |
| Sodium salt of carboxymethyl-cellulose | | 50.0 g |
| Carbon black (Raven-450, manufactured by Columbia Carbon Co., Ltd.) | | 150 g |
| Benzyl alcohol | | 1.5 ml |
| Distilled water | to make | 1000 ml |

Table 5-continued

| photographic element | cyan density | | | |
|---|---|---|---|---|
| | Dmax | Dmin | $D_{0.5}$ | $D_{1day}$/Dmax |
| XXIII-2 | 2.08 | 0.21 | 3'34" | 0.89 |

Dmin represents a minimum density of the transfer image 60 minutes after processing. $T_{0.5}$ and $D_{1day}$/Dmax in Table 5 have the same meanings as defined in Example 1.

The polymers of the present invention show higher Dmax and lower Dmin in comparison with the control compound, and have remarkably high dye-image-formation rates. Further, they showed no distortion of the dye image, no discoloration and so on.

EXAMPLE 3

The following layers were coated in order on the opacifying agent containing layer of the photographic elements XIV-1–XXIII-1 and B-1 in Example 1 to prepare monochromic photographic elements XIV-3–XXIII-3 and B-3 respectively.

(1) A layer containing a red sensitive silver iodobromide emulsion (average grain size: 0.8μ, silver iodide: 2 mol.%, 10.2 mg/100 $cm^2$ calculated on silver), 1-phenyl-4-hydroxymethyl-4-methyl-3-pyrazolidone (0.5 mg/100 $cm^2$), gelatin (22.0 mg/100 $cm^2$), a non-diffusible image dye-providing material (0.005 mMol./100 $cm^2$) of the formula:

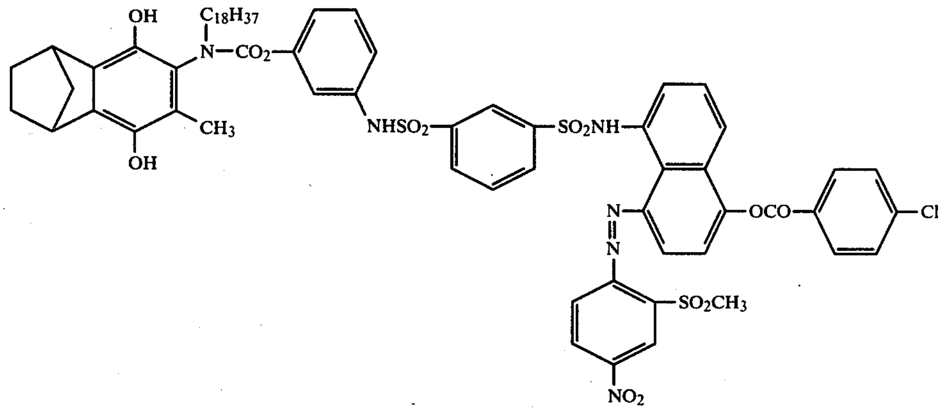

and N,N-diethyllauroylamide (10 mg/100 $cm^2$)

(2) A protective layer containing gelatin (10.0 mg/100 $cm^2$) and mucochloric acid (1.2 mg/100 $cm^2$)

The photographic element thus prepared was exposed to light in the same manner as in Example 2 and the same processing sheet as in Example 2 was superposed upon the exposed element. Further, a container containing about 1 ml of a processing composition mentioned below was positioned between the processing and the exposed element in the same manner as in Example 2 to prepare a film unit.

The film unit thus obtained was passed through between a pair of juxtaposed pressure rollers with a gap of about 340 μm to rupture the container to spread the content between the protective layer and the timing layer mentioned above.

The processing composition used were as follows.

| | |
|---|---|
| Potassium hydroxide | 70 g |
| Sodium bisulfite | 2.0 g |

Dye image was observed after several minutes through the transparent support of the photographic element.

Reflection densities of the dye obtained were measured by using a Sakura photoelectric densitometer type PDA-60 (manufactured by Konishiroku Photo Industries, Ltd.) with a red ($\lambda_{max}$=644 nm.) filter. The results are shown in Table 5.

Table 5

| photographic element | cyan density | | | |
|---|---|---|---|---|
| | Dmax | Dmin | $D_{0.5}$ | $D_{1day}$/Dmax |
| B-2 | 1.63 | 0.34 | 5'50" | 0.22 |
| XIV-2 | 2.29 | 0.21 | 3'35" | 0.98 |
| XV-2 | 2.27 | 0.20 | 3'22" | 0.96 |
| XVI-2 | 2.15 | 0.22 | 3'44" | 097 |
| XVII-2 | 2.06 | 0.18 | 3'48" | 0.91 |
| XVIII-2 | 2.36 | 0.23 | 3'18" | 0.95 |
| XIX-2 | 2.03 | 0.19 | 3'38" | 0.92 |
| XX-2 | 1.96 | 0.19 | 3'46" | 0.92 |
| XXI-2 | 2.33 | 0.24 | 3'20" | 0.99 |
| XXII-2 | 2.32 | 0.26 | 3'04" | 0.97 |

-continued

| | |
|---|---|
| 1-Phenyl-4-hydroxymethyl-4-methylpyrazolidone | 5 g |
| Potassium bromide | 20 g |
| Sodium salt of carboxy-methylcellulose | 50 g |
| Carbon black (Raven-50, manufactured by Columbia Carbon Co., Ltd.) | 150 g |
| Distilled water | to make 1000 ml |

After several minutes, a cyan-dye-image was observed through the transparent support of the photographic element. The reflection densities of the thus obtained dye image were measured by using a red ($\lambda_{max}$=644 nm.) filter and a Sakura photoelectric densitometer type PDA-60 (manufactured by Konishiroku Photo Industries, Ltd.).

The results are shown in Table 6.

Table 6

| photographic | cyan density | | | |
|---|---|---|---|---|
| element | $D_{max}$ | $D_{min}$ | $T_{0.5}$ | $D_{1day}/D_{max}$ |
| B-3 | 1.70 | 0.30 | 8'25" | 0.30 |
| XIV-3 | 2.16 | 0.19 | 6'12" | 0.98 |
| XV-3 | 2.23 | 0.18 | 6'14" | 0.93 |
| XVI-3 | 2.13 | 0.14 | 6'06" | 0.94 |
| XVII-3 | 1.96 | 0.15 | 6'48" | 0.92 |
| XVIII-3 | 2.29 | 0.22 | 6'02" | 0.95 |
| XIX-3 | 2.03 | 0.21 | 6'21" | 0.96 |
| XX-3 | 1.98 | 0.24 | 6'23" | 0.92 |
| XXI-3 | 2.32 | 0.24 | 5'58" | 0.95 |
| XXII-3 | 2.28 | 0.21 | 6'10" | 0.98 |
| XXIII-3 | 2.09 | 0.24 | 6'18" | 0.91 |

Dmin, $T_{0.5}$ and $D_{1day}$/Dmax in Table 6 have the same meanings as defined in Example 2.

From Table 6 above, it will be understood that the photographic elements of the present invention not only show higher Dmax and lower Dmin but also have a sufficient dye-image-formation rate and do not show bad influences on the emulsion. On the other hand, the control element shows lower Dmax, higher Dmin and unsatisfactory dye-image-formation rate. Further, in the control element, one day after processing, the desorption of dyes and the distortion of image occured.

From the results obtained above, it will be understood that various properties are improved remarkably by using the polymers of the present invention.

EXAMPLE 4

Upon a mordant-containing layer of each photographic element prepared in the above mentioned test example were coated further the same layers as the light reflecting agent containing layer and the opacifying agent containing layer of Example 1 in sequence to prepare photographic elements I-2 to XIII-2 and A-2, respectively.

A film unit was prepared by using each photographic element, a dye-releasing sheet prepared in the same way as Sheet (A) in Example 1, and a container containing 1 ml of same processing composition as in Example 1. Next, the film unit mentioned above was processed and the density of the obtained dye image was measured in the same way as in Example 1.

The results are shown in Table 7.

Table 7

| photographic element | $D_{max}$ | $T_{0.5}$ (min) | $D_{1day}/D_{max}$ |
|---|---|---|---|
| I-2 | 2.13 | 3.8 | 1.08 |
| II-2 | 2.08 | 3.6 | 1.05 |
| III-2 | 1.97 | 4.0 | 0.92 |
| IV-2 | 2.23 | 4.6 | 1.16 |
| V-2 | 1.96 | 3.7 | 1.08 |
| VI-2 | 2.27 | 3.6 | 1.11 |
| VII-2 | 2.02 | 4.7 | 0.97 |
| VIII-2 | 1.90 | 3.0 | 0.93 |
| IX-2 | 1.92 | 4.9 | 0.96 |
| X-2 | 2.06 | 4.1 | 1.07 |
| XI-2 | 2.16 | 3.8 | 1.07 |
| XII-2 | 1.90 | 5.6 | 1.10 |
| XIII-2 | 2.21 | 3.3 | 1.06 |
| A-2 | 1.77 | 8.6 | 1.36 |

In Table 7 above, Dmax, $T_{0.5}$, $D_{1day}$, $D_{1day}$/Dmax have the same meanings as defined in Example 1. Namely, a mordant having a ratio D1day/Dmax of far more than 1.0 is a mordant which causes the dye diffusion after dye image formation, and a mordant having the ratio of far less than 1.0 is one which causes desorption of a dye once mordanted.

A good mordant is one which shows not only a strong mordanting property but also a high dye-image-formation rate, and which does not cause the desorption of dyes. It will be understood that all the polymers according to this invention possess higher mordantability in comparison with control compound, have excellent dye-image-formation rates and do not cause the desorption of dyes.

EXAMPLE 5

Upon the opacifying agent containing layer of each photographic element prepared in Example 1 were coated the following layers in order to prepare multicolor photographic elements I-3 to XIII-3 and A-3.

(1) A layer containing a cyan image dye-providing material

A layer containing 5.4 mg/100 $cm^2$ of a cyan image dye-providing material having the following formula:

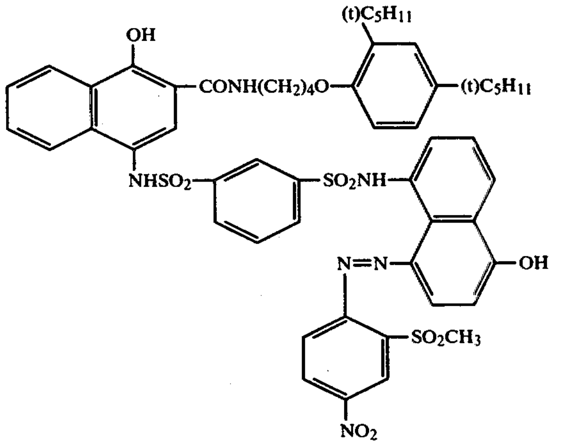

2.7 mg/100 $cm^2$ of 1,4-cyclohexylenedimethylene-bis-(2-ethylhexanoate) and 25 mg/100 $cm^2$ of gelatin.

(2) A red sensitive internal latent image type direct-positive silver bromide emulsion layer A layer containing a red sensitive internal latent image type direct-positive silver bromide emulsion (11 mg/100 $cm^2$ calculated on silver and 11 mg/100 $cm^2$ of gelatin), potassium 2-octadecylhydroquinone-5-sulfonate (16 g. per one mole of silver), and neucleating agents 1-acetyl-2-{4-[5-amino-2-(2,4-di-t-pentylphenoxy)benzamido]phenyl}-hydrazine (150 mg. per one mole of silver) and 1-p-formylhydrazinophenyl-3-phenyl-2-thiourea (6 mg. per one mole of silver).

(3) An intermediate layer

A layer containing 11 mg/100 $cm^2$ of gelatin and 11 mg/100 $cm^2$ of 2,5-di-sec-dodecylhydroquinone.

(4) A layer containing a magenta image dye-providing material

A layer containing 5.4 mg/100 $cm^2$ of a magenta image dye-providing material represented by the following formula:

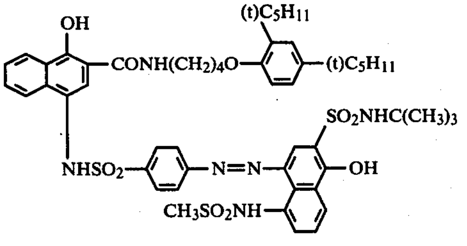

10 mg/100 $cm^2$ of diethyllauroylamide and 20 mg/100 $cm^2$ of gelatin.

(5) A green sensitive internal latent image type direct-positive silver bromide emulsion layer A layer containing a green sensitive internal latent image type direct-positive silver bromide emulsion (silver 12.5 mg/100 $cm^2$, gelatin 13 mg/100 $cm^2$), potassium 2-octadecylhydroquinone-5-sulfonate (16 g. per one mole of silver), and nucleating agents, 1-acetyl-2-{4-[5-amino-2-(2,4-di-t-pentylphenoxy) benzamido]phenyl}hydrazine (120 mg. per one mole of silver) and 1-formylhydrazinophenyl-3-phenyl-2-thiourea (2.5 mg. per one mole of silver).

(6) An intermediate layer

A layer containing gelatin (16 mg/100 $cm^2$) and 2,5-di-sec-dodecylhydroquinone (13 mg/100 $cm^2$).

(7) A layer containing a yellow image dye-providing material

A layer containing a yellow image dye-providing material (8.6 mg/100 $cm^2$) having the following formula:

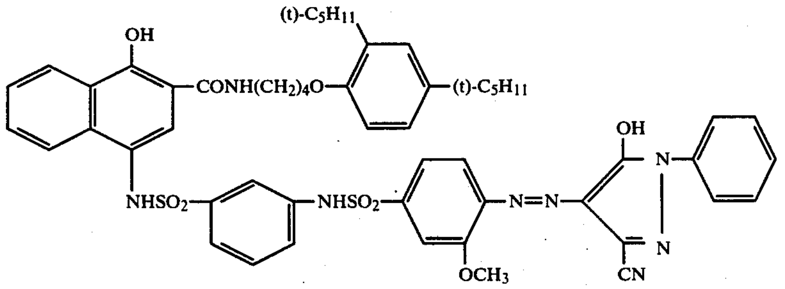

diethyllauroylamide (4.3 mg/100 $cm^2$) and gelatin (11 mg/100 $cm^2$).

(8) A blue sensitive internal latent image type direct-positive silver bromide emulsion layer A layer containing a blue sensitive internal latent image type direct-positive silver bromide emulsion (12.5 mg/100 $cm^2$ calculated on silver, 11 mg/100 $cm^2$ of gelatin), 5-sec-octadecyl-5-hydroquinone-2-sulfonic acid (16 g. per one mole of silver) and 1-acetyl-2-{4-[5-amino-2-(2,4-di-t-pentylphenoxy)benzamido]phenyl}hydrazine (500 mg. per one mole of silver).

(9) A protective layer of 0.7μ in dry thickness containing mucochloric acid (2.0 mg/100 $cm^2$) and gelatin (10 mg/100 $cm^2$).

Next, the following layers were coated in order on a transparent polyethylene terephthalate film support having a thickness of 100μ to prepare a processing sheet.

(1) A neutralizing layer of 22.0μ in dry thickness containing a copolymer of acrylic acid and n-butyl acrylate (ratio by weight: 75/25, average molecular weight $\overline{M}n$=70,000) (220 mg/100 $cm^2$).

(2) A second timing layer of 5μ in dry thickness containing a mixture (50 mg/100 $cm^2$) of a cellulose acetate (degree of acetylation: 40%) and an around-50%-hydrolysate of a (styrene-maleic anhydride) copolymer in a mixture ratio by weight of 95 to 5.

(3) A first neutralization-rate-regulating layer of 2.1μ in dry thickness containing poly(vinylidene chloride-co-acrylonitrile-co-acrylic acid) (ratio by weight: 79/15/16) (21 mg/100 $cm^2$).

Each multilayer multicolor photographic element thus prepared was subjected to prescribed exposure in the same way as in Example 2. Thereafter, a photographic material was prepared by superposing the processing sheet mentioned above upon the exposed element. Between the processing sheet and the exposed element was positioned a container containing 1 ml of the same processing composition as used in Example 2 at the front edge of the photographic element to prepare a film unit. Next, the film unit was passed through between a pair of rollers as mentioned above to rupture the container to spread the content between the protective layer and the first timing layer mentioned above.

Dye image was observed after several minutes through the transparent support of the photographic element.

Reflection densities, i.e., the maximum transfer density (Dmax) and the minimum transfer density (Dmin) were measured twice, i.e., one hour after and one day after processing with respect to each color of red, green and blue. The measurements were conducted by using a Sakura photoelectric densitometer type PDA-60 manufactured by Konishiroku Photo Industries, Co., Ltd. and each of a red filter ($\lambda_{max}$=644 nm.), a green filter ($\lambda_{max}$=546 nm.) and a blue filter ($\lambda_{max}$=436 nm.).

The results are shown in Table 8.

Table 8

| photographic element | red | | | | green | | | | blue | | | |
|---|---|---|---|---|---|---|---|---|---|---|---|---|
| | 1 hour after processing | | 1 day after processing | | 1 hour after processing | | 1 day after processing | | 1 hour after processing | | 1 day after processing | |
| | $D_{max}$ | $D_{min}$ | $D_{max}$ | $D_{min}$ | $D_{max}$ | $D_{min}$ | $D_{max}$ | $D_{min}$ | $D_{max}$ | $D_{min}$ | $D_{max}$ | $D_{min}$ |
| I - 3 | 2.11 | 0.28 | 2.13 | 0.21 | 2.03 | 0.12 | 2.05 | 0.14 | 1.83 | 0.11 | 1.89 | 0.13 |
| II - 3 | 2.08 | 0.21 | 2.07 | 0.20 | 1.98 | 0.19 | 1.99 | 0.19 | 1.85 | 0.18 | 1.88 | 0.19 |
| III - 3 | 1.87 | 0.19 | 1.87 | 0.20 | 1.92 | 0.21 | 1.91 | 0.18 | 1.82 | 0.19 | 1.83 | 0.22 |
| IV - 3 | 2.10 | 0.22 | 2.13 | 0.24 | 2.02 | 0.21 | 2.04 | 0.21 | 1.98 | 0.22 | 2.01 | 0.23 |
| V - 3 | 1.82 | 0.26 | 1.89 | 0.28 | 1.92 | 0.23 | 1.97 | 0.25 | 2.01 | 0.27 | 2.06 | 0.29 |
| VI - 3 | 2.18 | 0.25 | 2.19 | 0.25 | 2.11 | 0.20 | 2.13 | 0.24 | 2.00 | 0.21 | 2.04 | 0.26 |
| VII - 3 | 1.96 | 0.18 | 1.94 | 0.17 | 1.97 | 0.19 | 1.96 | 0.18 | 1.89 | 0.18 | 1.87 | 0.17 |
| VIII - 3 | 1.89 | 0.21 | 1.88 | 0.21 | 2.06 | 0.22 | 2.04 | 0.20 | 1.92 | 0.22 | 1.91 | 0.20 |
| IX - 3 | 1.87 | 0.21 | 1.83 | 0.18 | 1.94 | 0.20 | 1.91 | 0.20 | 1.88 | 0.21 | 1.88 | 0.21 |
| X - 3 | 2.01 | 0.18 | 2.01 | 0.19 | 2.02 | 0.20 | 2.05 | 0.23 | 1.97 | 0.18 | 1.98 | 0.18 |
| XI - 3 | 2.12 | 0.23 | 2.11 | 0.23 | 2.14 | 0.22 | 2.15 | 0.22 | 2.01 | 0.23 | 2.03 | 0.25 |
| XII - 3 | 1.88 | 0.24 | 1.96 | 0.27 | 1.96 | 0.24 | 1.99 | 0.28 | 1.99 | 0.22 | 2.01 | 0.24 |
| XIII - 3 | 2.04 | 0.21 | 2.06 | 0.24 | 1.99 | 0.20 | 2.01 | 0.21 | 2.00 | 0.23 | 2.01 | 0.22 |
| A - 3 | 1.64 | 0.37 | 1.77 | 0.42 | 1.59 | 0.28 | 1.68 | 0.38 | 1.43 | 0.39 | 1.70 | 0.62 |

The photographic element using the polymer of this invention shows high mordantability and low Dmin. Further, there was observed neither dye diffusion after dye image formation nor desorption of dyes. In contrast to that, control photographic element showed low Dmax and high Dmin. Further, the image obtained with A-3 was remarkably stained due to dye diffusion after dye image formation.

EXAMPLE 6

Upon the opacifying-agent-containing layer of photographic elements I-2, II-2, IV-2, VI-2, XIII-2 and A-2 were coated in order same layer as a layer containing a non-diffusible image dye-forming material and a protective layer in Example 3 to prepare monochromic photographic elements I-4, II-4, IV-4, VI-4, XIII-4 and A-4, respectively.

The photographic element thus prepared was exposed to light in the same manner as in Example 3 and the same processing sheet as used in Example 3 was superposed upon the exposed element. Further, a container containing about 1 ml of same processing composition as used in Example 3 was positioned in the front edge of the element in the same manner as in Example 3 to prepare a film unit.

The film unit obtained was passed through between a pair of rollers mentioned above to rupture the container to spread the content between the protective layer and the timing layer mentioned above.

After several minutes, a cyan-dye-image was observed through the transparent support of the photographic element. The reflection densities of the thus obtained dye image were measured in the same manner as in Example 3.

The results are shown in Table 9.

Table 9

| photographic element | red Dmax | red Dmin | $T_{0.5}$ ${}^{(min)}$ | D 1day/Dmin |
|---|---|---|---|---|
| I-4 | 1.87 | 0.31 | 6.72 | 1.01 |
| II-4 | 1.83 | 0.28 | 6.55 | 0.98 |
| IV-4 | 1.93 | 0.33 | 7.10 | 0.97 |
| VI-4 | 2.01 | 0.35 | 6.12 | 0.96 |
| XIII-4 | 1.94 | 0.28 | 6.21 | 0.94 |
| A-4 | 1.12 | 0.31 | 10.20 | 1.53 |

Dmax, Dmin, D1day/Dmin and $T_{0.5}$ in Table 9 have the same meaning as defined in Example 3.

As is clear from the above results, the mordants according to this invention show high Dmax and dying speed, and do not cause the desorption of dyes and the stain due to dye diffusion after dye image formation.

In contrast to that, control mordant shows low Dmax: A-4 shows large dye diffusion after dye image formation.

EXAMPLE 7

The following layers were coated in order on a transparent polyethylene terephthalate support of 100μ in thickness to prepare photographic elements I-5, II-5, VI-5, XIII-5 and A-5.

(1) A neutralizing layer

A layer of 220μ in dry thickness containing butyl half-ester of an ethylene-maleic anhydride copolymer (220 mg/100 $cm^2$).

(2) A timing layer

An aqueous dispersion containing a copolymer of butyl acrylate, diacetone acrylamide, styrene and methacrylic acid (60:30:4:6) and a polyacrylamide in an amount of 1/40 by weight based on the copolymer was coated so that the dry thickness might be 5μ.

(3) An image receiving layer

A coating composition composed of 12 g. of polyvinyl alcohol, 12 g. (as polymeric solid) of a polymeric mordant, 5 ml of EMULGEN-108 (tradename of Nihon Yushi Co., Ltd.) and 340 ml of water was coated so that the dry thickness might become 6μ. As the polymeric mordants were used exemplified polymers (P-21), (P-23), (P-28) and (P-40), and control polymer A.

Upon an opaque polyethylene terephthalate support were coated the following layers in sequence to prepare a light-sensitive multilayer film.

(4) A layer containing a cyan-dye developer

A cyan-dye developer, 1,4-bis(α-methyl-β-hydroquinonylethylamino)-5,8-dihydroxyanthraquinone was dissolved in a mixed solvent of N-n-butylacetanilide and 4-methylcyclohexanone. The thus prepared solution was emulsified and dispersed in an aqueous gelatin containing Alakanol B (alkyl naphthalenesulfonate, manufactured by E. I. Du Pont de Nemours). The thus obtained dispersion containing a cyan-dye developer was coated on said support to prepare a layer containing a cyan-dye developer so that the amounts of gelatin and the cyan-dye developer might be 20 mg/100 $cm^2$ and 15 mg/100 $cm^2$, respectively.

(5) A red sensitive emulsion layer

A red sensitive emulsion layer containing a red sensitive negative silver iodobromide emulsion (20 mg/100 $cm^2$ calculated on silver) and gelatin (10 mg/100 $cm^2$).

(6) An intermediate layer

An intermediate layer containing gelatin (20 mg/100 $cm^2$).

(7) A layer containing a magenta-dye developer

A magenta-dye developer, 2-[p-(β-hydroquinonylethyl)phenylazo]-4-n-propoxy-1-naphthol was dissolved in a mixed solvent composed of N-n-butylacetanilide and 4-methylcyclohexanone. The solution thus prepared was dispersed as an emulsion in an aqueous gelatin solution containing Alkanol B as a dispersant. The thus obtained dispersion containing a magneta-dye developer was coated so that the amounts of gelatin and a magenta-dye developer might be 10 mg/100 $cm^2$ and 7 mg/100 $cm^2$, respectively, to form a layer containing a magenta-dye developer.

(8) A green sensitive emulsion layer

A green sensitive emulsion layer containing a green sensitive negative silver iodobromide emulsion (10 mg silver/100 $cm^2$) and gelatin (6 mg/100 $cm^2$).

(9) An intermediate layer

An intermediate layer containing gelatin (15 mg/100 $cm^2$).

(10) A layer containing a yellow-dye developer

A layer containing a yellow-dye developer, which was prepared by dissolving a yellow-dye developer, 1-phenyl-3-N-n-hexylcarboxyamido-4-[(p-2′,5′-hydroxyphenethyl)-phenylazo]-5-pyrazolone in a mixed solvent of N,N-diethyllauroylamide and ethyl acetate; by dispersing the thus prepared solution as an emulsion in an aqueous gelatin solution containing Alkanol B as a dispersant; and by coating the thus obtained dispersion containing a dye developer so that the amounts of gelatin and the yellow dye developer might be 5 mg/100 $cm^2$ and 5 mg/100 $cm^2$, respectively.

(11) A blue sensitive emulsion layer

A blue sensitive emulsion layer containing a blue sensitive negative silver iodobromide (6 mg/100 $cm^2$ calculated on silver) and gelatin (6 mg/100 $cm^2$).

(12) A protective layer

4′-Methylphenylhydroquinone was dissolved in N,N-diethyllauroylamide and the resulting solution was dispersed in an aqueous gelatin solution by using Alakanol B as a dispersant. To 100 ml of the thus obtained dispersion was added 5 ml of a 2% aqueous solution of mucochloric acid and the resulting mixture was coated so that the coated amounts of 4′-methylphenylhydroquinone and gelatin might be 1 mg/100 $cm^2$ and 3 mg/100 $cm^2$.

The thus prepared light-sensitive multilayer film was subjected to prescribed exposure to light given from the side of the protective layer through an optical wedge composed of 30 steps in total of silver wedge with the density difference of 0.15 between one step and the next. The resulting film thus exposed was superposed upon the photographic element mentioned above, and in the front edge thereof was positioned a container containing 1 ml of the processing composition having the composition mentioned below, in the same manner as in Example 5 to prepare a film unit. The film unit thus obtained was passed through between a pair of rollers mentioned above to rupture the container to spread the content between the protective layer and the image receiving layer mentioned above.

The alkaline processing composition were as follows.

| | |
|---|---|
| Potassium hydroxide | 11.2 g |
| Carboxymethylcellulose | 5 g |
| Benzotriazole | 7 g |
| N-phenethyl-α-picolium bromide | 0.12 g |
| Benzylaminopurine | 0.12 g |
| Titanium dioxide | 50 g |
| Water | 100 ml |

Dye image was observed after several minutes through the transparent support of the photographic element mentioned above. The reflection densities of the resulting dye image were measured in the same manner as in Example 5.

The results obtained are shown in Table 10.

Table 10

| photographic element | red: 1 hour after processing Dmax | Dmin | red: 1 day after processing Dmax | Dmin | green: 1 hour after processing Dmax | Dmin | green: 1 day after processing Dmax | Dmin | blue: 1 hour after processing Dmax | Dmin | blue: 1 day after processing Dmax | Dmin |
|---|---|---|---|---|---|---|---|---|---|---|---|---|
| I - 5 | 2.37 | 0.26 | 2.38 | 0.28 | 2.16 | 0.22 | 2.20 | 0.25 | 2.21 | 0.23 | 2.24 | 0.26 |
| II - 5 | 2.24 | 0.21 | 2.24 | 0.22 | 2.26 | 0.24 | 2.27 | 0.24 | 2.18 | 0.20 | 2.18 | 0.21 |
| VI - 5 | 2.33 | 0.24 | 2.32 | 0.24 | 2.25 | 0.25 | 2.25 | 0.25 | 2.08 | 0.18 | 2.09 | 0.21 |
| XIII - 5 | 2.06 | 0.18 | 2.08 | 0.19 | 2.02 | 0.24 | 2.10 | 0.28 | 1.98 | 0.19 | 2.01 | 0.22 |
| A - 5 | 1.32 | 0.23 | 1.55 | 0.29 | 1.16 | 0.18 | 1.49 | 0.37 | 1.58 | 0.33 | 1.72 | 0.46 |

As is clear from Table 10, it is indicated that the photographic element according to this invention gives high value of Dmax and low value of Dmin and presents little variation in density during standing at room temperature, little migration of a mordant in itself between layers and little desorption of dyes.

In contrast to that, Dmin is high and Dmax is low in cases where control photographic element is used. In addition, the control shows large variation in density during standing at room temperature, a poor mordanting property and migration of the mordant.

EXAMPLE 8

The following layers were coated in order upon the opacifying-agent-containing layer of the photographic element VI-2 prepared in Example 4 to prepare photographic elements VI-6 to VI-9.

(1) A scavenger layer

A scavenger layer of 2 to 1.5μ in dry thickness containing exemplified polymers (P-21), (P-22) or (P-40) according to this invention, or control polymer A ($0.8 mg/100 cm^2$) and gelatin ($10.5 mg/100 cm^2$).

(2) A layer containing a cyan image dye-providing material

A layer of 2.2μ in dry thickness containing a DRR compound ($2.7 mg/100 cm^2$) having the following formula:

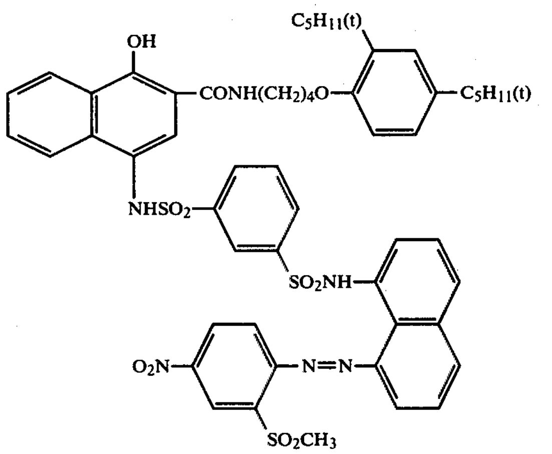

N,N-dimethyllauroylamide ($11 mg/100 cm^2$) and gelatin ($25.0 mg/100 cm^2$).

(3) A red sensitive emulsion layer of about 1.5μ in dry thickness containing a red sensitive internal latent image type direct-positive silver bromide ($14.3 mg silver/100 cm^2$), potassium 2-octadecylhydroquinone-5-sulfonate ($0.9 mg/100 cm^2$), formyl-4'-methylphenylhydrazide ($0.13 mg/100 cm^2$) and gelatin ($16.5 mg/100 cm^2$).

(4) A protective layer of 0.7μ in thickness containing mucochloric acid ($1.0 mg/100 cm^2$) and gelatin ($10.0 mg/100 cm^2$).

The photographic element thus prepared was subjected to prescribed exposure in the same manner as in Example 2. Upon the element thus exposed was superposed the same processing sheet as used in Example 5. A film unit was prepared by using a container containing the same processing composition as in Example 5. The film unit thus prepared was passed through between a pair of rollers mentioned above to spread the content between the protective layer and the first neutralization-rate-regulating layer mentioned above. After several minutes, a dye image was observed through the transparent support of the photographic element.

The reflection densities of the thus obtained dye image were measured in the same manner as in Example 5.

The result obtained as shown in Table 11.

Table 11

| photographic element | red Dmax | Dmin | $T_{0.5}$ (min) | D 1day/min |
|---|---|---|---|---|
| VI-6 | 2.08 | 0.18 | 8.1 | 1.10 |
| VI-7 | 2.04 | 0.17 | 8.0 | 1.02 |
| VI-8 | 1.98 | 0.16 | 7.4 | 1.06 |
| VI-9 (control) | 0.97 | 0.24 | 17.8 | 1.88 |

$T_{0.5}$ in Table 11 has the same meaning as defined in Example 4. D1day/Dmin has the same meaning as defined in Example 6. When the value of D1day/Dmin is far more than 1, The polymeric scavenger is inferior in scavengeability. It is not preferable to use a polymer which lowers the value of Dmax, even if it has enough scavengeability.

According to Table 11, the polymers according to this invention lower the value of Dmin without lowering the value of Dmax as scavenger. Further, even after standing for one day, Dmin does not increase and thus the polymer according to this invention possesses an excellent scavengeability.

In contrast to that, control scavenger not only lowers the value of Dmax but also causes much variation of Dmin with time.

We claim:

1. A photographic element comprising a support and a layer which comprises a polymer containing at least 10 mole percent of a repeating unit of the formula:

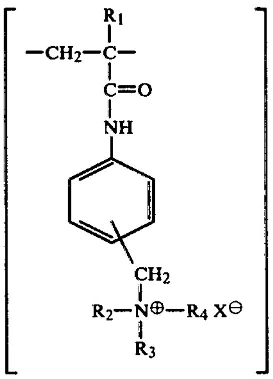

wherein $R_1$ represents a hydrogen atom or a methyl group; $R_2$, $R_3$ and $R_4$ each represent an alkyl group, an aralkyl group, a cycloalkyl group or a cycloalkylalkyl group; and $X^{\oplus}$ represents a monovalent anion.

2. A photographic element as claimed in claim 1, in which said element is for use in color diffusion transfer process and said polymer is a polymeric mordant wherein $R_2$, $R_3$ and $R_4$ each represent an alkyl group having 1 to 20 carbon atoms or an aralkyl group having 7 to 12 carbon atoms.

3. A photographic element as claimed in claim 2, wherein said alkyl groups each have 1 to 18 carbon atoms.

4. A photographic element as claimed in claim 3 wherein $R_2$ and $R_3$ each represent an alkyl group having 1 to 18 carbon atoms, and $R_4$ represents an aralkyl group having 7 to 12 carbon atoms.

5. A photographic element as claimed in claim 1, which is for use in color diffusion transfer process and wherein said polymer is a polymeric mordant being substantially water-dispersible and comprising units of the formula:

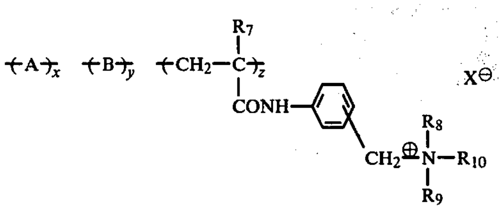

wherein A represents a unit derived from a copolymerizable monomer having at least two ethylenically unsaturated groups; B represents a unit derived from a copolymerizable monomer having an ethylenically $\alpha,\beta$-unsaturated group; $R_7$ represents a hydrogen atom or a methyl group; $R_8$ and $R_9$ each represent a lower alkyl group; $R_{10}$ represents an alkyl group, an aralkyl group, a cycloalkyl group or a cycloalkylalkyl group; $X^{\oplus}$ represents a monovalent anion; x is from 0.5 to 6.0 mole percent; y is from 0 to 79.5 mole percent; and z is from 20 to 99.5 mole percent.

6. A photographic element as claimed in claim 5 wherein $R_8$ and $R_9$ each represent an alkyl group having 1 to 4 carbon atoms, and $R_{10}$ represents an alkyl group having 1 to 16 carbon atoms, an aralkyl group having 7 to 12 carbon atoms, a cycloalkyl group having 5 to 6 carbon atoms or a cyclopentylmethyl group.

7. A photographic element as claimed in claim 6 wherein $R_8$ and $R_9$ each represent an alkyl group having 1 to 4 carbon atoms, and $R_{10}$ repesents an alkyl group having 1 to 16 carbon atoms or an aralkyl group having 7 to 12 carbon atoms.

8. A photographic element as claimed in claim 7 wherein $R_{10}$ represents an alkyl group having 1 to 12 carbon atoms or an aralkyl group having 7 to 8 carbon atoms.

9. A photographic element as claimed in claim 5 wherein $R_7$ represents a methyl group.

10. A photographic element as claimed in claim 5 wherein x, y and z range from 1 to 5 mole percent, from 0 to 69 mole percent and from 30 to 99 mole percent, respectively.

11. A photographic element as claimed in claim 5 wherein A represents a unit derived from divinylbenzene.

12. A photographic element as claimed in claim 5 wherein B represents a unit derived from a styrene or a lower-alkyl ester of acrylic acid or methacrylic acid.

13. A photographic element as claimed in claim 12 wherein B represents a unit derived from a styrene.

14. A photographic element as claimed in claim 5 wherein A represents a unit derived from divinylbenzene; B represents a unit derived from styrene; $R_7$ represents a methyl group; $R_8$ and $R_9$ each represent an alkyl group having 1 to 4 carbon atoms; and $R_{10}$ represents an alkyl group having 1 to 12 carbon atoms or an aralkyl group having 7 to 8 carbon atoms.

15. A photographic element as claimed in claim 14 wherein $R_8$ and $R_9$ each represent a methyl group; $R_{10}$ represents a benzyl group; and x, y and z range from 1 to 5 mole percent, from 0 to 69 mole percent and from 30 to 99 mole percent, respectively.

16. A photographic element for use in color diffusion transfer process which comprises in sequence a support, an image receiving layer containing a mordant, a reflecting-agent-containing layer, an opacifying-agent-containing layer, and at least one light-sensitive silver halide emulsion layer having associated therewith an image dye-providing material and wherein said mordant is a polymer containing at least 10 mole percent of a repeating unit of the formula:

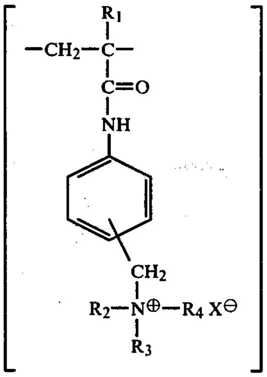

wherein $R_1$ represents a hydrogen atom or a methyl group; $R_2$, $R_3$ and $R_4$ each represent an alkyl group, an aralkyl group, a cycloalkyl group or a cycloalkylalkyl group; and $X^{\oplus}$ represents a monovalent anion.

17. A photographic element as claimed in claim 16 wherein $R_2$ and $R_3$ each represent an alkyl group having not more than 18 carbon atoms and $R_4$ represents an aralkyl group having 7 to 12 carbon atoms.

18. A photographic element as claimed in claim 16 wherein said polymer is a polymeric mordant being substantially water-dispersible and comprising units of the formula:

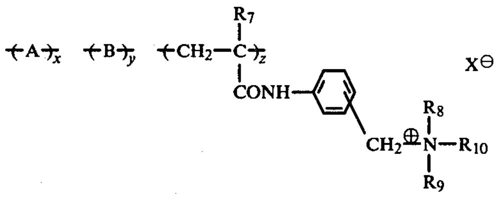

wherein A represents a unit derived from a copolymerizable monomer having at least two ethylenically unsaturated groups; B represents a unit derived from a copolymerizable monomer having an ethylenically, $\alpha,\beta$-unsaturated group; $R_7$ represents a hydrogen atom or a methyl group; $R_8$ and $R_9$ each represent a lower alkyl group; $R_{10}$ represents an alkyl group, an aralkyl group, a cycloalkyl group or a cycloalkylalkyl group; $X^{\oplus}$ represents a monovalent anion; and x is from 0.5 to 6.0 mole percent; y is from 0 to 79.5 mole percent; and z is from 20 to 99.5 mole percent.

19. A photographic element as claimed in claim 18 wherein $R_{10}$ represents an alkyl group having 1 to 12 carbon atoms or an aralkyl group having 7 to 8 carbon atoms.

20. A photographic element as claimed in claim 18 wherein $R_7$ represents a methyl group.

21. A photographic element as claimed in claim 18 wherein x, y and z range from 1 to 5 mole percent, from 0 to 69 mole percent and from 30 to 99 mole percent, respectively.

22. A photographic element as claimed in claim 18 wherein A represents a unit derived from divinylbenzene and B represents a unit derived from styrene or a lower-alkyl ester of acrylic acid or methacrylic acid.

23. A photographic element as claimed in claim 22 wherein A represents a unit derived from divinylbenzene; B represents a unit derived from styrene; $R_7$ represents a methyl group; $R_8$ and $R_9$ each represent an alkyl group having 1 to 4 carbon atoms; and $R_{10}$ represents an alkyl group having 1 to 12 carbon atoms or an aralkyl group having 7 to 8 carbon atoms.

24. A photographic element as claimed in claim 23 wherein $R_8$ and $R_9$ each represent a methyl group; $R_{10}$ represents a benzyl group; and x, y and z range from 1 to 5 mole percent, from 0 to 69 mole percent and from 30 to 99 mole percent, respectively.

25. A photographic element as claimed in claim 16, wherein said support is transparent.

* * * * *

UNITED STATES PATENT AND TRADEMARK OFFICE

CERTIFICATE OF CORRECTION

PATENT NO. : 4,193,800

DATED : March 18, 1980

INVENTOR(S) : HIDEAKI IWAMA et al

It is certified that error appears in the above-identified patent and that said Letters Patent are hereby corrected as shown below:

Abstract, line 2 from the bottom: replace "$X^{\oplus}$" with ---$X^{\ominus}$---.

Column 2, line 36: replace "$X^{\oplus}$" with ---$X^{\ominus}$---.

Column 2, line 64: replace "$X^{\oplus}$" with ---$X^{\ominus}$---.

Column 4, line 61: replace "colloidal layers. The" with ---colloidal layers, the---.

Column 5, line 64: replace "$X^{\oplus}$" with ---$X^{\ominus}$---.

Column 6, lines 18 and 19: replace "$X^{\oplus}$" with ---$X^{\ominus}$--- (two occurrences).

Column 11, at formula "(P-15)": replace "$\leftarrow CH_2-C \rightarrow_y$" with --- $\leftarrow CH_2-CH \rightarrow_y$ ---.

Column 13, at formula "(P-16)": replace "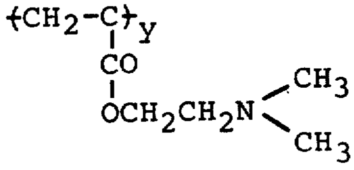

with --- 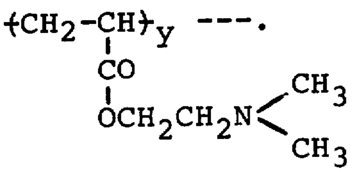 ---.

UNITED STATES PATENT AND TRADEMARK OFFICE
CERTIFICATE OF CORRECTION

PATENT NO. : 4,193,800 Page 2 of 3

DATED : March 18, 1980

INVENTOR(S) : HIDEAKI IWAMA et al

It is certified that error appears in the above-identified patent and that said Letters Patent are hereby corrected as shown below:

Column 15, at formula "(P-25)":

replace " 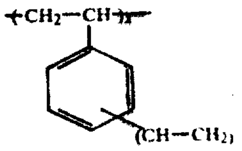 " with --- 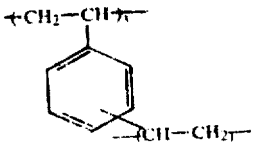 ---.

Column 17, at formula "(P-26)": replace "$(CH_2-C)_z$" with --- $(CH_2-CH)_z$ ---.

Column 23, at formula "(P-42)":

replace " 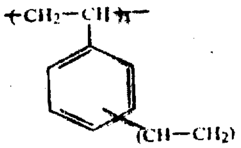 " with --- 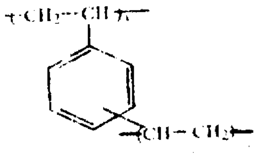 ---.

Column 28, line 1: replace "obtined" with ---obtained---.

Column 28, line 36: replace "orgiginated" with ---originated---.

Column 29, line 43: replace "cloudly" with ---cloudy---.

Column 33, line 18: replace "representiative" with ---representative---.

Column 33, line 66: replace "containging" with ---containing---.

UNITED STATES PATENT AND TRADEMARK OFFICE
CERTIFICATE OF CORRECTION

PATENT NO. : 4,193,800

DATED : March 18, 1980

INVENTOR(S) : HIDEAKI IWAMA et al

It is certified that error appears in the above-identified patent and that said Letters Patent are hereby corrected as shown below:

Column 41, line 42: rewrite "upto" as ---up to---.

Column 42, line 21: replace "sinthesized" with ---synthesized---.

Column 47, line 28: replace "pass" with ---passed---.

Column 46, line 2, in the formula: replace "$\leftarrow CH_2-C \rightarrow_x$" with --- $\leftarrow CH_2-CH \rightarrow_x$ ---.

Column 55, line 45: before "obtained", insert ---thus---.

Column 60, line 14: before "polymeric", replace "The" with ---the---.

Column 60, line 51 (Claim 1): replace "$X^{\oplus}$" with ---$X^{\ominus}$---.

Column 61, line 20 (Claim 5): replace "$X^{\oplus}$" with ---$X^{\ominus}$---.

Column 62, line 26 (Claim 16): replace "$X^{\oplus}$" with ---$X^{\ominus}$---.

Column 62, line 54 (claim 18): replace "$X^{\oplus}$" with ---$X^{\ominus}$---.

Signed and Sealed this

*Thirtieth* Day of *December 1980*

[SEAL]

*Attest:*

SIDNEY A. DIAMOND

*Attesting Officer* *Commissioner of Patents and Trademarks*

UNITED STATES PATENT AND TRADEMARK OFFICE
CERTIFICATE OF CORRECTION

PATENT NO. : 4,193,800
DATED : March 18, 1980
INVENTOR(S) : HIDEAKI IWAMA et al

It is certified that error appears in the above—identified patent and that said Letters Patent is hereby corrected as shown below:

1) Column 3, line 48: replace "N-methylacryamide" with ---N-methylacrylamide---.

2) Column 3, lines 48-49: replace "N,N-dimethyacrylamide" with ---N,N-dimethylacrylamide---.

Signed and Sealed this

*Nineteenth* Day of *May 1981*

[SEAL]

*Attest:*

RENE D. TEGTMEYER

*Attesting Officer* *Acting Commissioner of Patents and Trademarks*